United States Patent [19]
Demong

[11] Patent Number: 5,366,059
[45] Date of Patent: Nov. 22, 1994

[54] STEERING SYSTEM FOR PLURALITY OF VEHICLES

[75] Inventor: Maurice Demong, N. Saskatoon, Canada

[73] Assignee: Prairie Machine & Parts Mfg. Ltd., Saskatoon, Canada

[21] Appl. No.: 112,758

[22] Filed: Aug. 25, 1993

[30] Foreign Application Priority Data

Aug. 27, 1992 [CA] Canada ................ 2077139

[51] Int. Cl.$^5$ .............................................. B65G 41/00
[52] U.S. Cl. ................................ 198/303; 280/476.1; 280/426; 280/442
[58] Field of Search ............... 198/303, 304, 589, 588, 198/594; 280/476.1, 426, 442

[56] References Cited

U.S. PATENT DOCUMENTS

| | | |
|---|---|---|
| 1,933,404 | 10/1933 | Allen et al. . |
| 2,805,760 | 9/1957 | Von Stroh et al. ............ 198/589 X |
| 2,948,552 | 8/1960 | Moon . |
| 3,231,064 | 1/1966 | Towles . |
| 3,279,584 | 10/1966 | Towles . |
| 3,361,248 | 1/1968 | Daymon .......................... 198/303 |
| 3,788,444 | 1/1974 | McWilliams . |
| 3,863,752 | 2/1975 | Sibley . |
| 3,974,907 | 8/1976 | Shaw et al. ....................... 198/589 |
| 4,031,997 | 6/1977 | Nelson . |
| 4,382,607 | 5/1983 | Voight . |

Primary Examiner—Cheryl L. Gastineau
Attorney, Agent, or Firm—Bliss McGlynn

[57] ABSTRACT

A steering system for steering a plurality of conveyor vehicles connected together in the form of a train. The vehicle has a first pair of wheels which can be steered by an operator as the train moves. There are further pairs of steerable wheels connected to the second and subsequent vehicles in the train and supporting same. There are hydraulic cylinders for steering each of the pairs of steerable wheels on the second and subsequent vehicles and a control mechanism for controlling these cylinders in order to set the steering angle of each further pair. This control mechanism includes means for determining the current steering angle of the first pair of wheels and generating an electrical signal indicative thereof and means for storing a series of these electrical signals as the train is travelling. Further means determine the amount of time the wheels in the train have been travelling and there is a calculator for determining the location of each of the further pairs of wheels on the basis of the determined travel time. A second electrical signal is generated for each further pairs of wheels in order to control its respective hydraulic cylinder and thereby set the steering angle of each pair at the same steering angle that the first pair of wheels had when they were at that location.

37 Claims, 23 Drawing Sheets

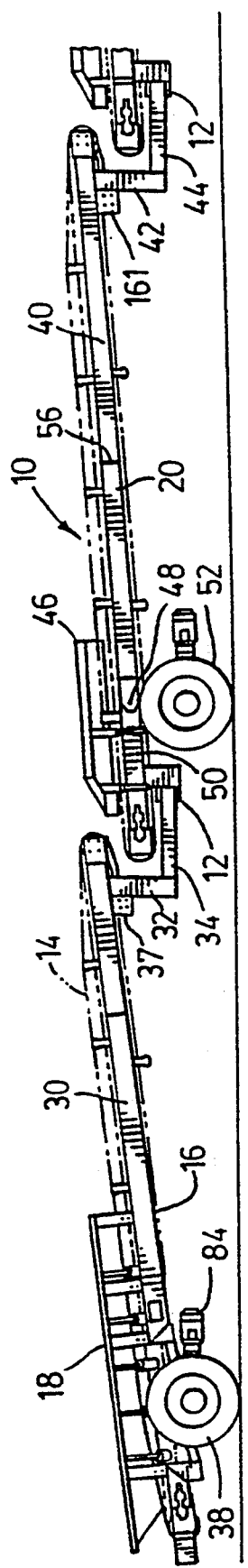
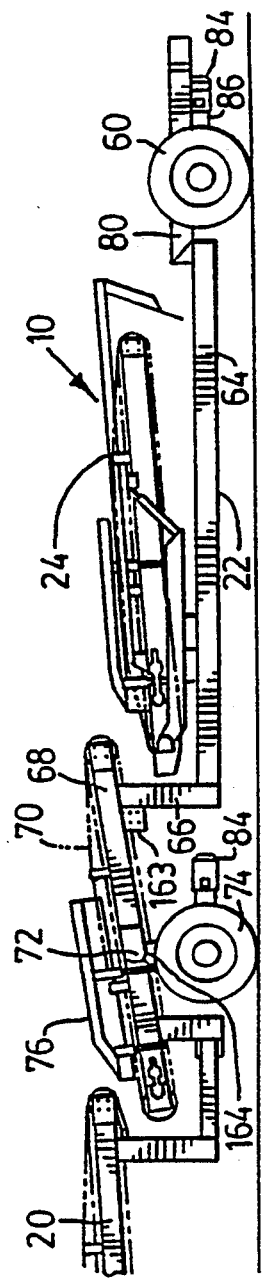

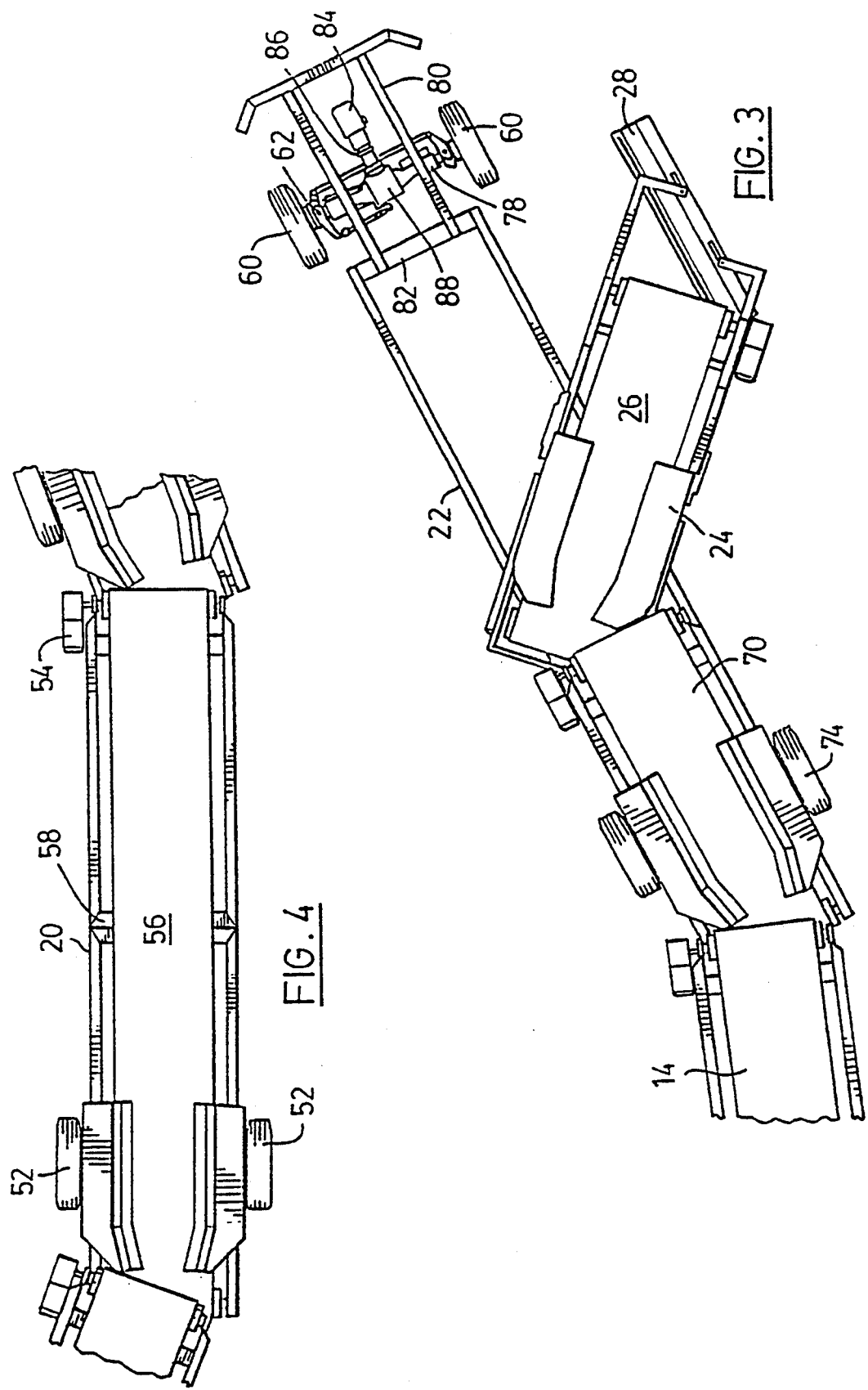

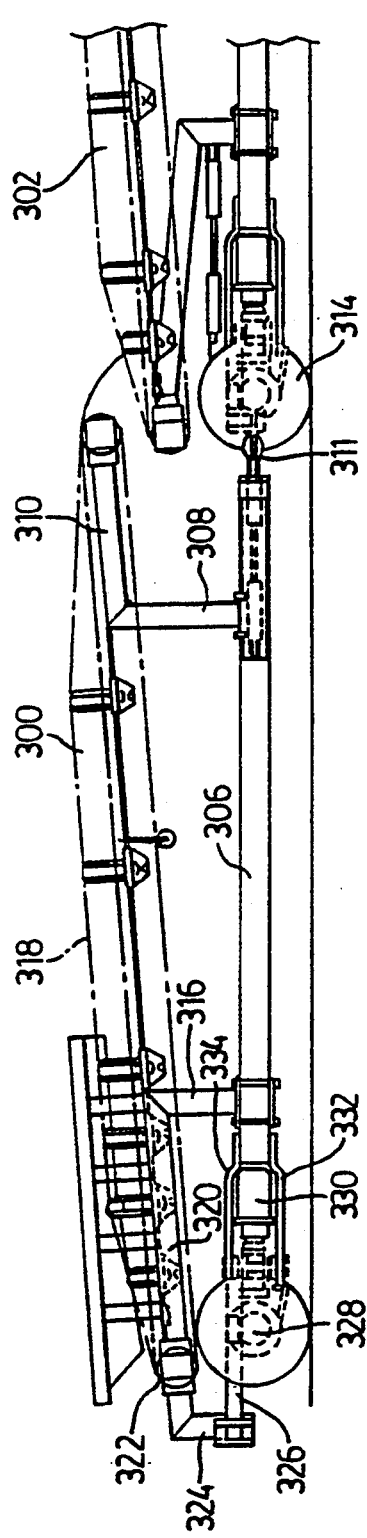
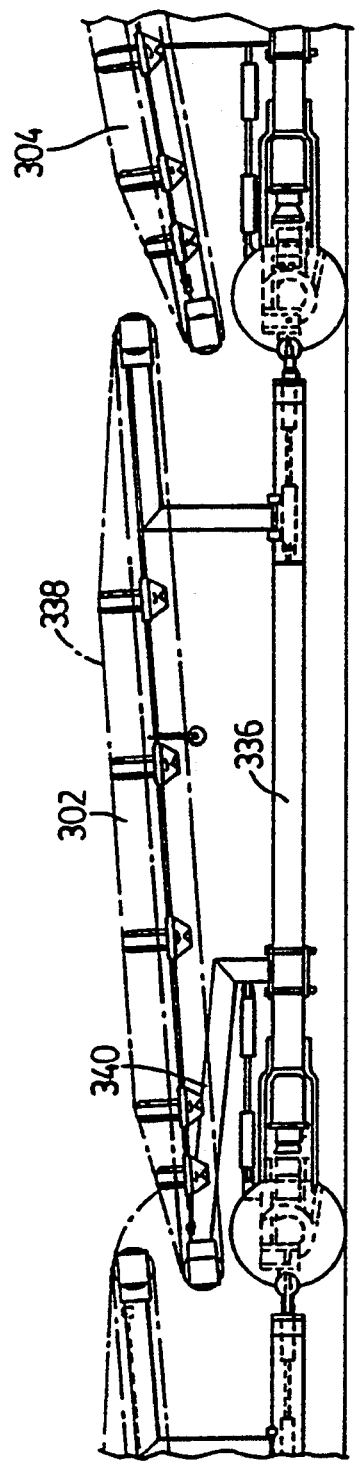

STEERING SYSTEM FOR PLURALITY OF VEHICLES

BACKGROUND OF THE INVENTION

The present invention relates to a steering system for a train of vehicles or cars which do not move on rails.

It is known to provide a conveying system, particularly for mining applications, wherein a series of conveyors are mounted on wheels so as to make the system transportable. Because of the manner in which mines are developed and extended, it may be necessary for the rather long conveyor system to be moved along a substantially curved or zig zag course. This has made it difficult in the past and time consuming to move the conveyor system when this is required. It will be appreciated that movement of the conveyor system is required fairly frequently as the mining machine advances in the mine.

Attempts have been made in connection with a movable conveyor system to have each vehicle track in a true manner behind the vehicle in front of it. One such system is disclosed in U.S. Pat. No. 4,382,607 issued May 10, 1983 to Edward T. Voight. This known system uses an elongated steering bar pivotably connected to each of adjacent vehicles at end portions of the bar permitting angular orientation of each vehicle in respect to the steering bar and other vehicles. Each end of the steering bar is linked to the near pair of vehicle wheels through wheel yoke pivot arms about king pin type pivots. Movement of the steering bar about its pivotal connection is said to provide proportional turning of the wheels to affect steering and tracking of one vehicle following another in either direction.

U.S. Pat. No. 3,788,444 issued Jan. 29, 1974 to Joseph McWilliams also describes a steering control for a power driven mobile conveyor. The conveyor frame is provided with a pair of wheels at each end with one wheel being power driven and the other wheel being of the idler caster type. The driven wheel is selectively power steerable about a vertical axis through a range of 180 degrees or more. The steerable wheels may be positioned transversely, longitudinally or diagonally of the conveyor frame.

It is an object of the present invention to provide an improved system for steering a plurality of vehicles in a train, which train may comprise a mobile conveyance system.

It is a further object of the invention to provide a steering system for a plurality of vehicles with a number of pairs of steerable propelling devices or wheels, said system including a control mechanism for controlling power means for steering each pair of propelling devices behind the first pair.

The steering system disclosed herein operates by determining the current steering angle of the pairs of steerable propelling devices or wheels in the system and by determining the amount of time the propelling devices in the train have been travelling in order to calculate the location of each pair of steerable propelling devices in the train, except for the first pair of steerable propelling devices on the loading or rear end vehicle. This computer operated system is able to set the steering angle of each of the trailing pairs of steerable wheels so that they will have the same steering angle as the first pair of wheels had when they were at the same location. In this way, each car in the train will accurately track the path of movement of the end vehicle, which in the case of a conveyor system is the rear end vehicle.

SUMMARY OF THE INVENTION

According to one aspect of the invention, a steering system capable of steering a plurality of vehicles in a train includes a selected pair of propelling devices, each separately connected at a generally vertical pivot to an axle of a selected vehicle and means for steering this selected pair of propelling devices as the train moves over the ground. There are at least two further pairs of steerable propelling devices, each of these further pairs being connected to its own respective vehicle and supporting same. Each propelling device in each of the further pairs is separately connected at a generally vertical pivot to an axle of the respective vehicle. Power means are provided to steer each of the further pairs of propelling devices and control means control the power means in order to set the steering angle of each of the further pairs of propelling devices. The control means includes means for determining the current steering angle of the selected pair of propelling devices and generating an electrical signal indicative thereof and means for storing a series of these electrical signals as the train is travelling on the ground. There are also means for determining the distance the propelling devices in the train have been travelling and means for sending directed turn signals to the power means for the further pairs of propelling devices in order to operate the power means. The control means sets the steering angle of each further pair at substantially the same steering angle that the selected pair of propelling devices had when they were at the location where the particular further pair is currently located.

In the preferred embodiment, the control means includes further means for determining the current steering angle of each of the further pairs of propelling devices or wheels and generating further electrical signals indicative of the current steering angles of these further pairs. The means for generating the directed turn signals can be a programmable logic controller.

According to another aspect of the invention, a cascading mobile conveyor comprises a plurality of vehicles pivotally connected together in the form of a train with each vehicle having part of a conveying system arranged thereon. These vehicles include a loading vehicle located at a rear end of the train, at least one intermediate vehicle and an unloading vehicle located at the front end of the train. There are a selected pair of propelling devices each separately connected at a generally vertical pivot to one of the vehicles and means for steering this selected pair. Further pairs of steerable propelling devices are pivotally mounted on vehicles that are trailing the one vehicle relative to a selected direction of train movement and these further pairs support their respective vehicles. A power mechanism, such as a hydraulic cylinder, steers each of these further pairs of propelling devices and electrical control means control the power mechanism in order to set the steering angle of each of the further pairs of propelling devices. The control means includes means for determining the current steering angle of the selected pair of propelling devices and generating a first electrical signal indicative thereof and means for storing a series of these first electrical signals as the train is travelling. There are also means for determining the distance the propelling devices in the train have travelled and means for sending electrical turn signals to the power mechanism for the further pairs of propelling devices in order to operate the power mechanism. The control means sets the steering angle of each further pair at substantially the same steering angle that the selected pair of propelling devices had when they were at the same location where the particular further pair is currently located.

Further features and advantages will become apparent from the following detailed description taken in conjunction with the accompanying drawings.

BRIEF DESCRIPTION OF THE DRAWINGS

FIG. 1 is a side elevation of the rear end loading car and a first intermediate car in a conveyor system made of a number of units or cars constructed in accordance with the invention;

FIG. 2 is a side elevation showing the front end car which is the unloading car of the conveyor system;

FIG. 3 is a plan view of the front end car in the train and showing how a cross-conveyor mounted thereon can be swung to one side to transfer material to a stationary conveyor system;

FIG. 4 is a plan view of an intermediate car of the train;

FIG. 18 is a side elevation of a preferred form of rear end loading car of a mobile conveyor;

FIG. 19 is a side elevation of a preferred form of an intermediate car of a mobile conveyor;

DETAILED DESCRIPTION OF PREFERRED EMBODIMENTS

Figure 5:
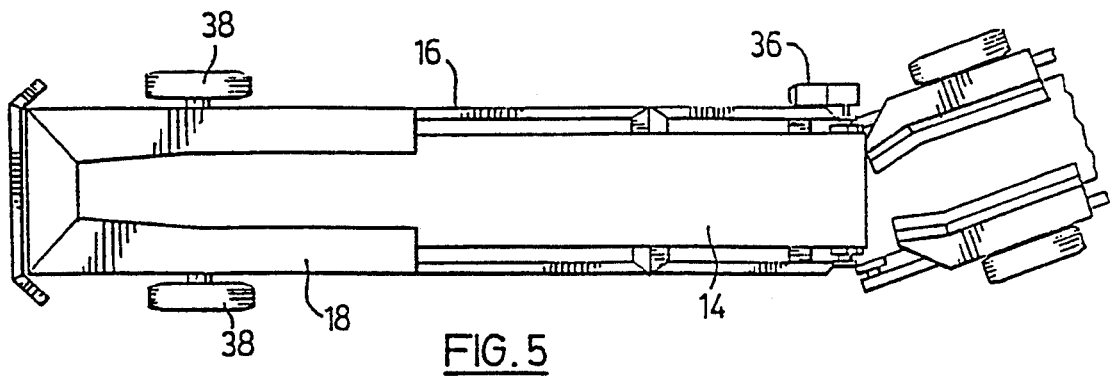
FIG. 5 is a plan view of the rear end loading car of the train.

The major components of a mobile conveyor system constructed in accordance with the invention are illustrated in FIGS. 1 to 5 of the drawings. This conveyor system 10 is made up of distinct units or cars (also called vehicles herein) which are mechanically linked together by pivot pins, there being a single pin 12 for connecting each car to the next car in the train. Each car is fitted with its own continuous conveyor belt 14 which extends in the lengthwise direction of the car. As known in the industry, instead of the illustrated conveyor belts, conveyor chains can also be used on the cars of a mobile conveyor system. The preferred mobile conveyor system has three different types of cars or vehicles pivotally connected together in the form of a train. These cars include a rear end car 16 which is a loading car with a large chute 18 to catch the material being thrown from a mining machine (not shown). The second type of car is an intermediate car 20 and although only one complete intermediate car is shown in the drawings, it will be understood that the intermediate cars make up most of the train. There can be as many as 20 or more intermediate cars in the conveyor system. The third type of car or vehicle in the system is the front end car located at the front or head of the train. This is an unloading car 22 which generally carries a cross-conveyor 24. The cross-conveyor which has its own continuous conveyor belt 26 is used to transfer the mined material from the mobile conveyor system 10 to a stationary conveyor system (not shown). A splash guard for the stationary conveyor is indicated at 28 in FIG. 3.

Turning now to a more detailed description of each of these three cars, the rear end car 16 has a longitudinally extending frame 30 to the front end of which is connected a downwardly extending leg 32. Extending forwardly from the leg 32 is a connecting tongue 34 having a hole in its front end to receive the aforementioned connecting pin 12. The tongue 34 connects the front end of the loading car to the rear end of the adjacent intermediate car 20 in such a manner that the front end of the conveyor on the loading car is positioned above the rear end of the conveyor belt on the intermediate car. In each case the articulation point provided by the pivot pin 12 is preferably directly underneath the loading point for the car 20 in order to provide a clean transfer of the mined material whatever the angle between the longitudinal centre axes of the two cars joined by the pin.

The loading car 16 is also equipped with a conveyor drive gear motor 36. The loading car 16 has only one axle in the illustrated embodiment and a first pair of wheels 38 is mounted at opposite ends of this axle. The mounting of these wheels will be explained in more detail hereinafter in connection with FIGS. 6, 7, and 9 of the drawings. However, it will be appreciated that each of the wheels 38 is separately connected by a generally vertical pivot to the axle and can be steered manually with the assistance of a hydraulic cylinder as explained hereinafter. The push button control panel for manually steering the loading car 16 is indicated at 37 in FIG. 1. This panel has four buttons, two for steering left or right and two for controlling the motor drive, forward and reverse. The wheels 38 as well as the other pairs of wheels described hereinafter could be replaced by short pivoting tracks if desired, as is known in the mobile conveyor industry. The term "propelling devices" as used herein is intended to include both wheels and track devices in the form of endless bands or tracks on which the vehicle is propelled.

Turning to the construction of each of the intermediate cars 20, these cars also have a longitudinally extending frame 40. Extending downwardly from the front end of each frame 40 is a frame extension 42. A connecting tongue 44 extends forwardly from each extension 42. Each intermediate car 20 is connected to either another intermediate car 20 located forwardly thereof or to the unloading car 22 by means of a connecting pin 12 extending through the front end of the tongue 44. Because of the extension 42, the rear end of the conveyor of each intermediate car is elevated above the front end of the conveyor of the next intermediate car. Suitable skirting 46 can be provided adjacent the front end of the intermediate car to catch the material falling onto the conveyor belt at the transfer point. Also, to provide the necessary flexibility in the conveyor system, each intermediate car can be provided with a horizontal pivot 48 located over the two wheels of that car. This permits the major forward portion of the frame 40 to pivot upwardly or downwardly relative to a short rear portion 50 of the frame. Like the loading car, each intermediate car has only one axle to which two wheels 52 are pivotally connected. Each pair of wheels 52 are steerable by the steering system of the present invention. The belt of each intermediate conveyor also has its own conveyor drive gear motor 54 which, in the illustrated embodiment, is located adjacent the front end of the conveyor. Each of the cars of the train, including the intermediate cars, can also be provided with a pivot pin located on the longitudinal centre line of the car in order to provide a torsional degree of freedom. The location of the centre line pivot pin for the intermediate car 20 is indicated at 56 in FIGS. 1 and 4. The pivot pin 56 connects together two parallel, adjacent transverse frame members indicated at 58 which join together two longitudinally extending frame members that are part of the complete frame 40. In this way it will be appreciated that the front portion of the frame 40 can pivot somewhat about the longitudinal centre axis of the car relative to the rear portion of the same frame 40.

The unloading car 22 has two axles with a pair of steerable wheels mounted on each of these axles. Again both pairs of wheels can be replaced by short tracks if desired. The front pair of wheels 60 are steerable manually by the operator of the train. The rear pair of wheels 74 is steered automatically by the controller described hereinafter. Each wheel 60 is separately connected at a generally vertical pivot 62 to the car 22.

The unloading car 22 has a lengthwise extending central frame 64 on which the cross-conveyor is mounted so as to be pivotable about a vertical axis. The car 22 also has a vertically extending frame leg 66 extending upwardly from the central frame 64 and rigidly connected to a longitudinally extending rearward frame 68. Movably mounted on the rearward frame is a relatively short belt conveyor 70 which unloads onto the adjacent cross-conveyor 24. Near the centre of the rearward frame 68 is a horizontal pivot 72 which is disposed directly above the axle for the rear wheels 74. The usual skirting 76 is provided on opposite sides of the conveyor 70 in order to catch the material falling from the adjacent intermediate car 20.

The front axle 78 of the unloading car is rigidly connected to a front frame section 80 which is located a short distance above the central frame 64. Two longitudinally extending members of the front frame 80 are connected to transverse frame 82. In the illustrated preferred embodiment, each pair of wheels including the wheels 60 and 74 on the unloading car are powered by an electric tram motor 84. In one preferred embodiment, this motor is a five horsepower electric motor that operates at 1800 RPM and has a 184TC frame. Each motor 84 is connected to a gear reducer 86 in the form of a planetary gear box mounted to the differential housing 88 of the axle (see FIG. 6). A preferred gear reducer for this purpose is that sold by Brevini ED2010/MN2-FL635/12. A suitable axle for present purposes is a John Deere 1150 Series steerable axle sold under P/N2561R144311111632.

Figure 6:
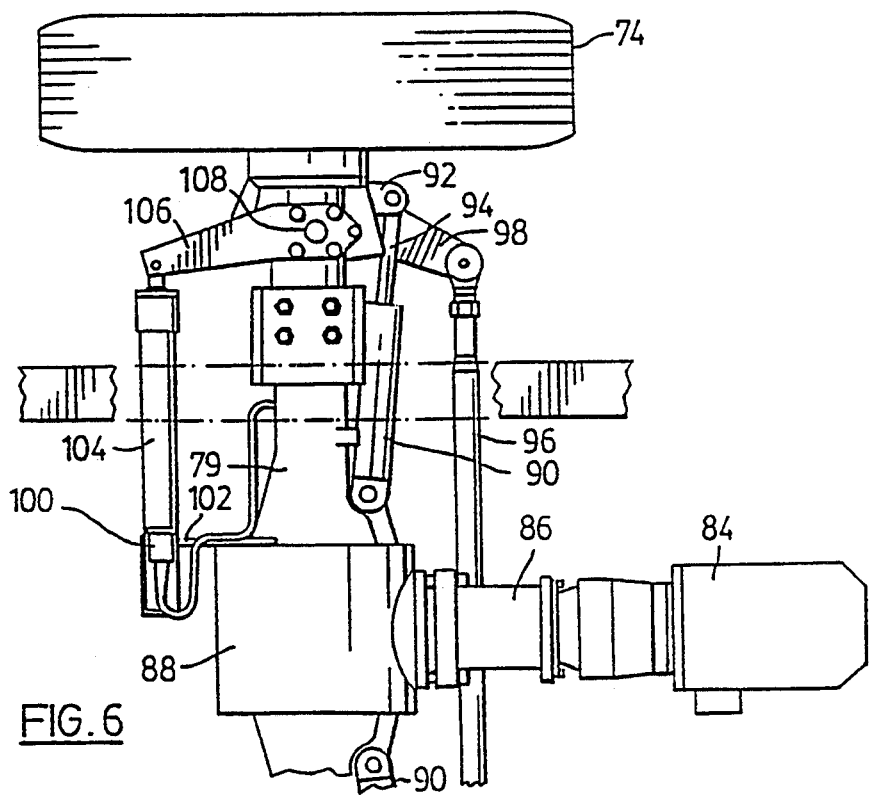
FIG. 6 is a detail view illustrating the steering mechanism for one of the cars of the train.

Turning now to a detailed discussion of the steering mechanism for each pair of wheels, reference will be made to FIGS. 6, 7, and 9 which illustrate the rear axle 79 of the unloading car. It will be appreciated that each pair of steerable wheels in the train is constructed in substantially the same fashion as that illustrated in FIGS. 6, 7, and 9. The aforementioned John Deere axle comes equipped with two hydraulic steering cylinders 90, one at each end of the axle. It will be understood that each hydraulic cylinder provides power means for steering its respective wheel by means of a steering arm 92 connected to the wheel at one end. The hydraulic cylinder has a movable rod 94 which is pivotally connected to the arm 92. To ensure that the wheels of each pair pivot together they are connected together by a tie rod 96 which is pivotally connected to a further arm 98 at each end. It will be understood that the arm 98 is connected to its respective wheel so as to pivot therewith about the vertical pivot axis.

Figure 7:
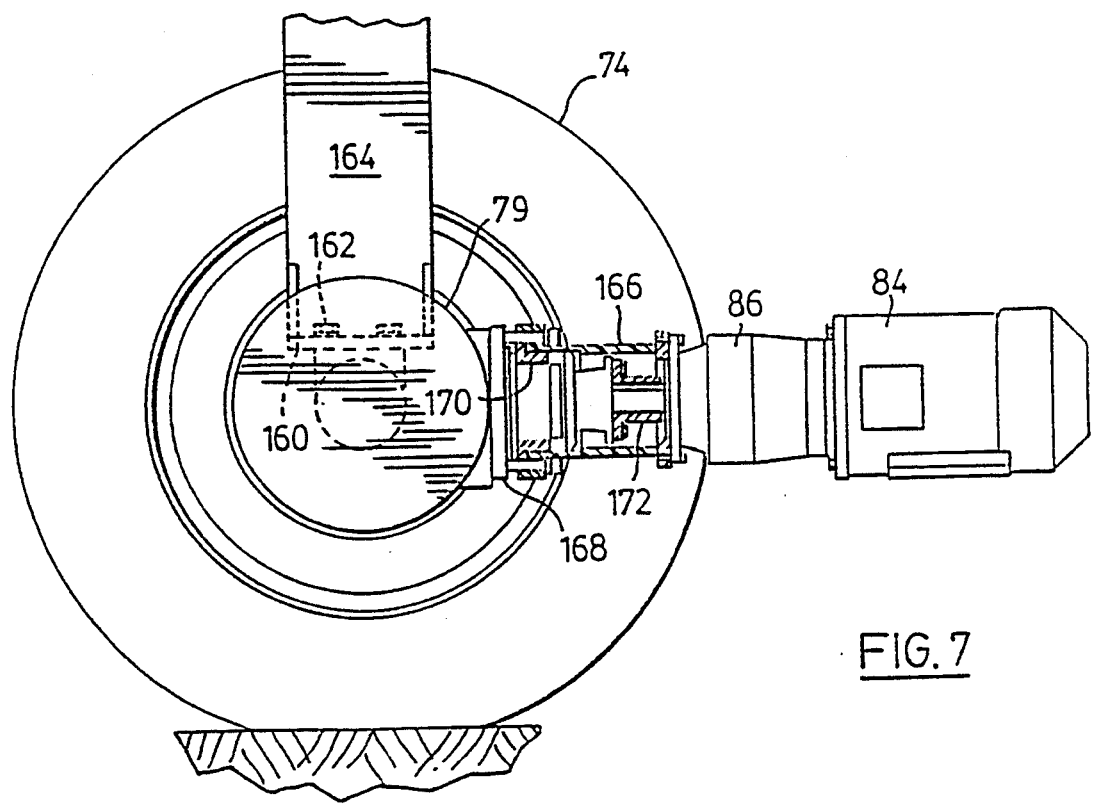
FIG. 7 is a side. elevation, partly in cross-section, providing a detail view of the mounting for each wheel and the motor drive.
Figure 8:
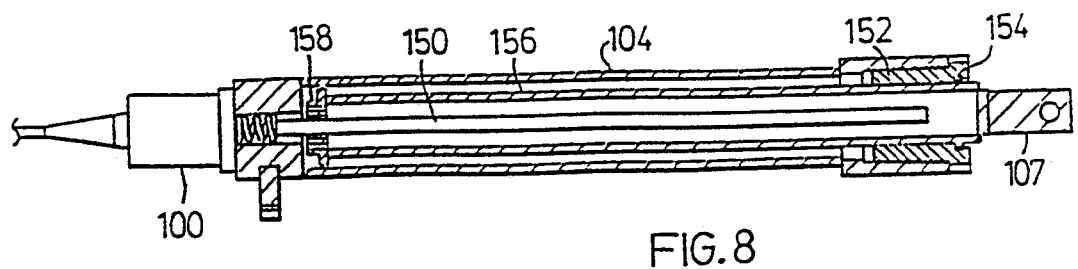
FIG. 8 is an axial cross-section of a linear displacement transducer device used to measure the steering angle.
Figure 9:
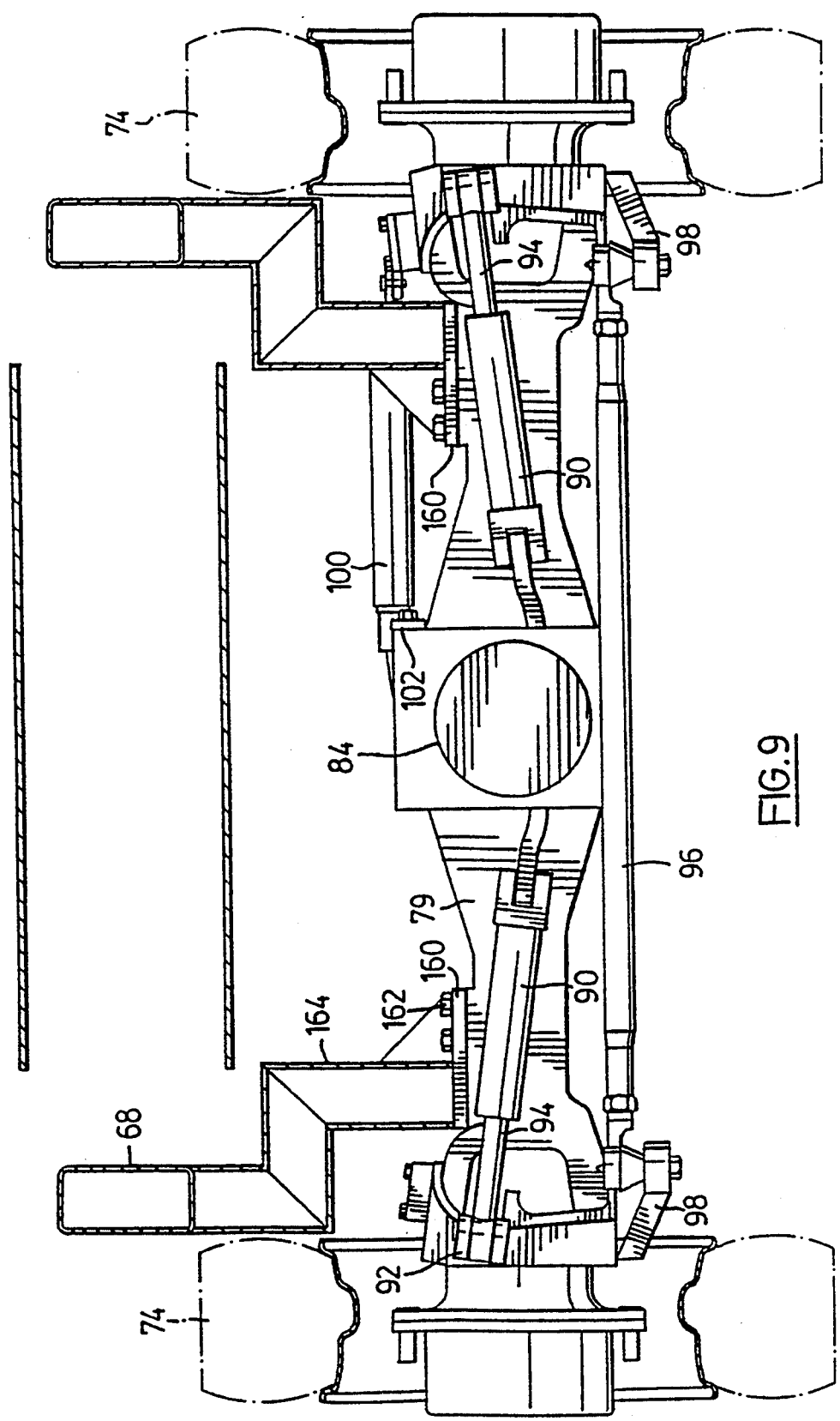
FIG. 9 is a front elevation of the steerable axle assembly of FIGS. 6 and 7.

With specific reference to FIGS. 7 and 9, the axle 79 is rigidly connected to two horizontal plates 160 by means of bolts 162. The plates 160 are connected to vertical legs 164 which are connected at the top to the aforementioned rearward frame 68. Connected to the front of the axle is a drive line housing 166 and bolted to the front end of this housing is the aforementioned gear reducer 86. The housing 166 is bolted to the axle by means of an axle input quill 168. The drive line extends through a drive line locating ring 170 which is arranged at the front end of housing 166. The output shaft of the gear reducer 86 is connected to the drive line by means of a drive line yoke adaptor 172.

There are means for determining the current steering angle of each pair of wheels. In one preferred embodiment this steering angle is measured using a linear displacement transducer indicated at 100 in FIGS. 5, 6, 8 and 9. This transducer is connected to the axle by means of a connecting plate 102. A preferred form of transducer is that manufactured by MTS Systems Corporation (Sensors Division) and sold under the trade mark TEMPOSONICS II (P/N TTS-RCU0120). This transducer has a rigid, elongate stainless steel rod 150 which extends into a steel tube 156 which in turn is enclosed in a mild steel cylinder or housing 104. The steel tube 156 is connected to a rearwardly extending pivot arm 106 by a connecting pin 107. The arm 106 is connected to the end of a pin 108 which pivots with the pivotal movement of the adjacent wheel. Mounted at the open end of the housing 104 is a brass gland member 152 having a rod wiper 154 mounted therein. The steel tube 156 is free to slide axially in the gland member. Connected to the inner end of the tube 156 is an annular magnet 158, such as MTS magnet 201542. It is the linear movement of the magnet 158 relative to the rod 150 which enables the LDT to provide the required electrical signal that indicates the current steering angle of the wheel.

There are control means for controlling the hydraulic steering cylinders for each pair of wheels trailing the wheels of either the loading car or the unloading car in order to set the steering angles for these further pairs of wheels. The control means includes means mounted on the first axle (the one for the wheels 38 or the wheels 60) to determine the current steering angle of the first pair of wheels. In particular, the linear displacement transducer (hereinafter referred to as LDT) of the first pair of wheels generates a first electrical signal indicative of the steering angle of the first pair of wheels at a particular point in time. This electrical signal is sent to a programmable logic controller (hereinafter referred to as the PLC) which is able to store a series of these first electrical signals as a train travels on the ground. The control system also includes means for determining the amount of time the wheels in the train have been travelling from a set point in time. This travelling time is read by the PLC. After a selected time interval, the PLC samples and stores the steering angle of the loading car wheels 38 or the unloading car wheels 60 (depending on the direction of travel). The PLC provides means for sending electrical turn signals to the steering cylinders for each of these further pairs of wheels in order to operate the hydraulic steering cylinders. The control system thereby sets the steering angle of each pair of wheels at substantially the same steering angle that the first pair of wheels had when they were at the location where the particular further pair is currently located. A suitable PLC for this control system is the Logic Master 9070 sold by General Electric which has several components including a CPU 731 with an internal retentive timer.

Figure 13:
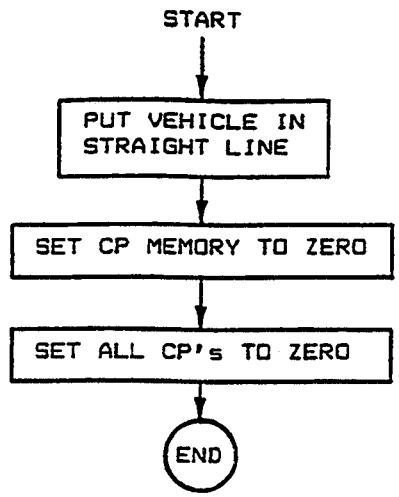
FIG. 13 is a flow chart of the start-up logic used for the steering system of the invention.
Figure 14:
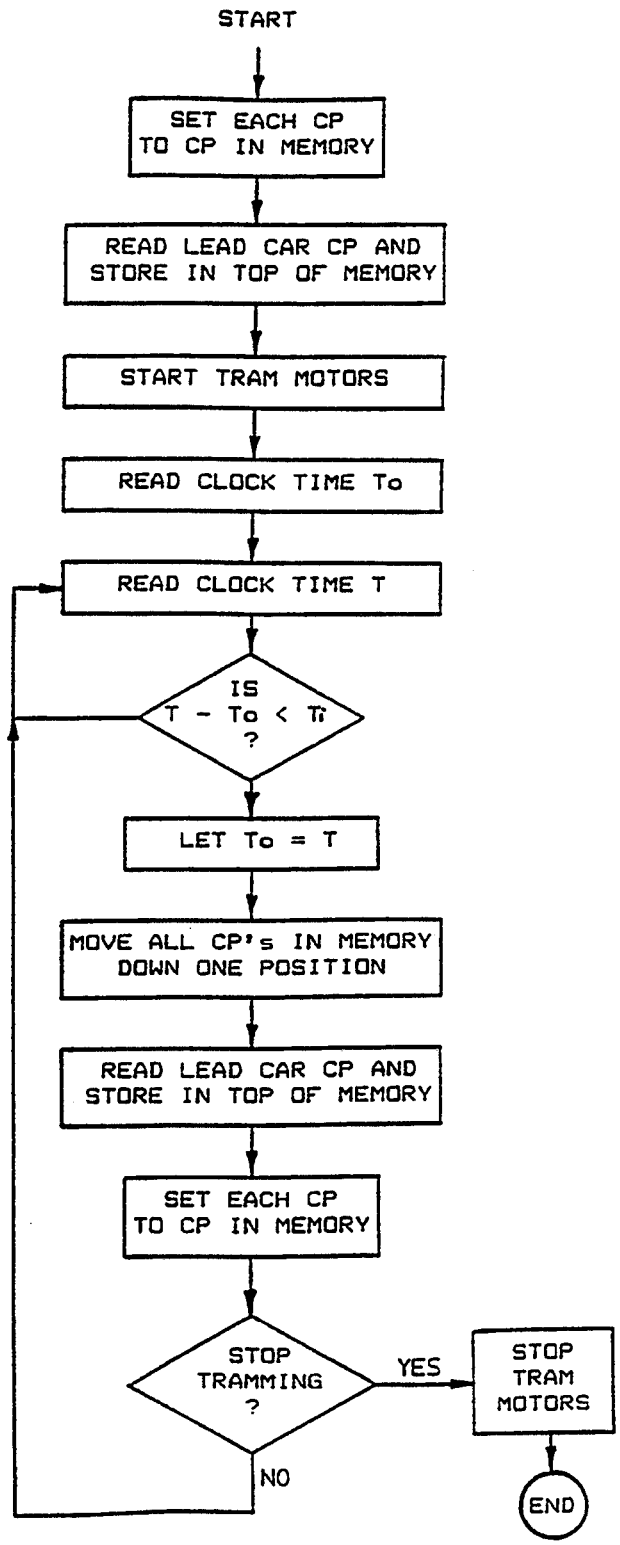
FIG. 14 is a flow chart of the operating logic used for the steering system.

One form of logic for the PLC is illustrated by the flow charts of FIGS. 13 and 14. FIG. 13 illustrates how the system is initialized. The designation CP stands for steering cylinder position. At startup, the train is arranged in a straight line and the memory for the steering cylinder position is set at zero. Also all of the steering cylinder positions in the train are set to zero.

In the flow chart of FIG. 14 the term Ti stands for constant time increment which is related to the distance moved. The term To represents the start time for the tramming operation while the term T stands for the current time. After each steering cylinder position has been set to that indicated in the memory (as explained above) the PLC reads the steering angle for the end car that is to be steered manually and stores this position in the top of its memory. The tram motors 84 are then operated to commence movement of the train and this start up time is recorded in the memory of the PLC. Then periodically the current time T is read from the clock by the PLC. The PLC will continue to read the clock time until the lapsed time is equal to or greater than the constant time increment at which time the start time will be reset to the current time. When this occurs all of the steering cylinder positions in the memory of the PLC are moved down one position in the memory. Next the steering cylinder position of manually steered car (called the lead car in FIG. 13) is read and stored at the top of the memory. The PLC then sets each steering cylinder position to the stored steering cylinder position for the position where the particular set of wheels is then located. The PLC then determines whether or not the train of cars is still moving or tramming. If the train has stopped, the tram motors will be stopped and the process will end. It the train is still moving, this cycle will repeat itself beginning with the PLC reading the current clock time.

Another system which can be used for the measurement of the distance travelled is one employing a radar sensor, for example that sold by Magnovox (trade mark), Model RGSS101. The radar sensor can measure the speed of travel of the train and, using this information along with the travel time, the PLC can calculate the distance or location of each axle on the train. When an axle hits a point where the PLC has sampled and remembers the lead car steering angle, the PLC sets that axle to the same angle. The PLC sets the steering angle of each axle by operating an electro-hydraulic valve for the hydraulic steering cylinders mounted on that axle and by using the LDT as a feedback.

Figure 10:
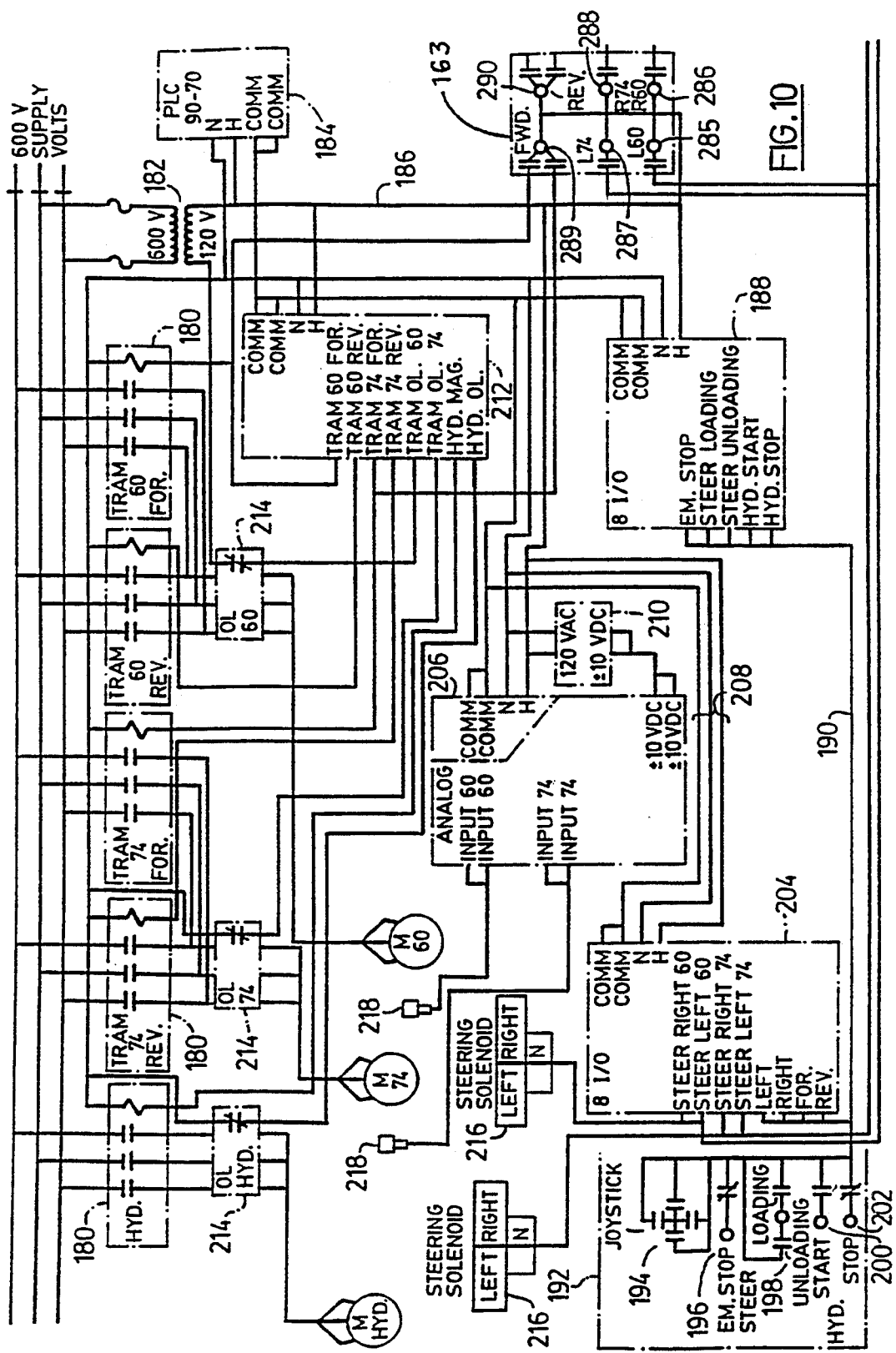
FIG. 10 is an electrical circuit diagram showing the electrical controls for steering the unloading car.
Figure 11:
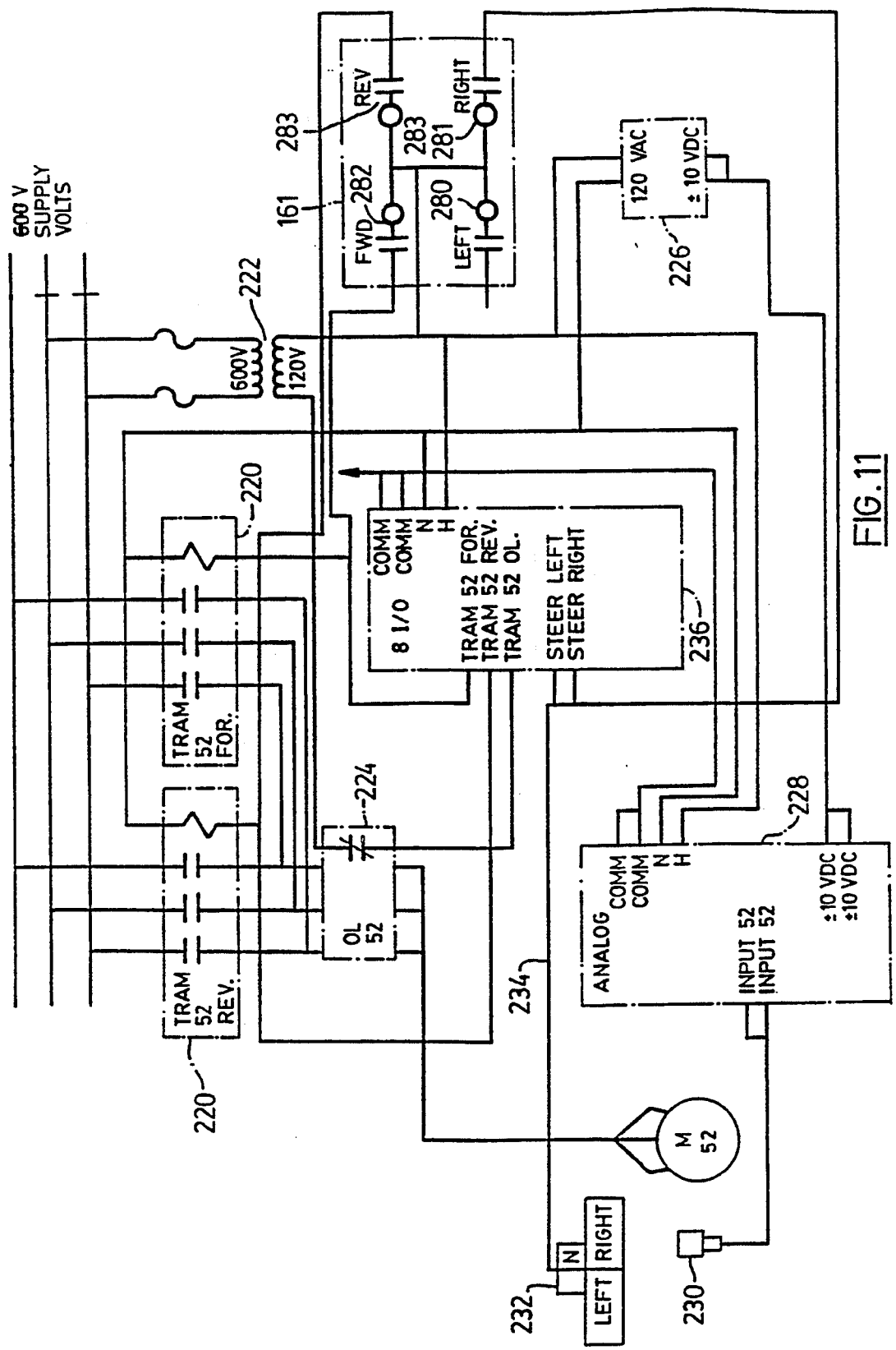
FIG. 11 is an electrical circuit diagram showing the electrical controls for steering an intermediate car.
Figure 12:
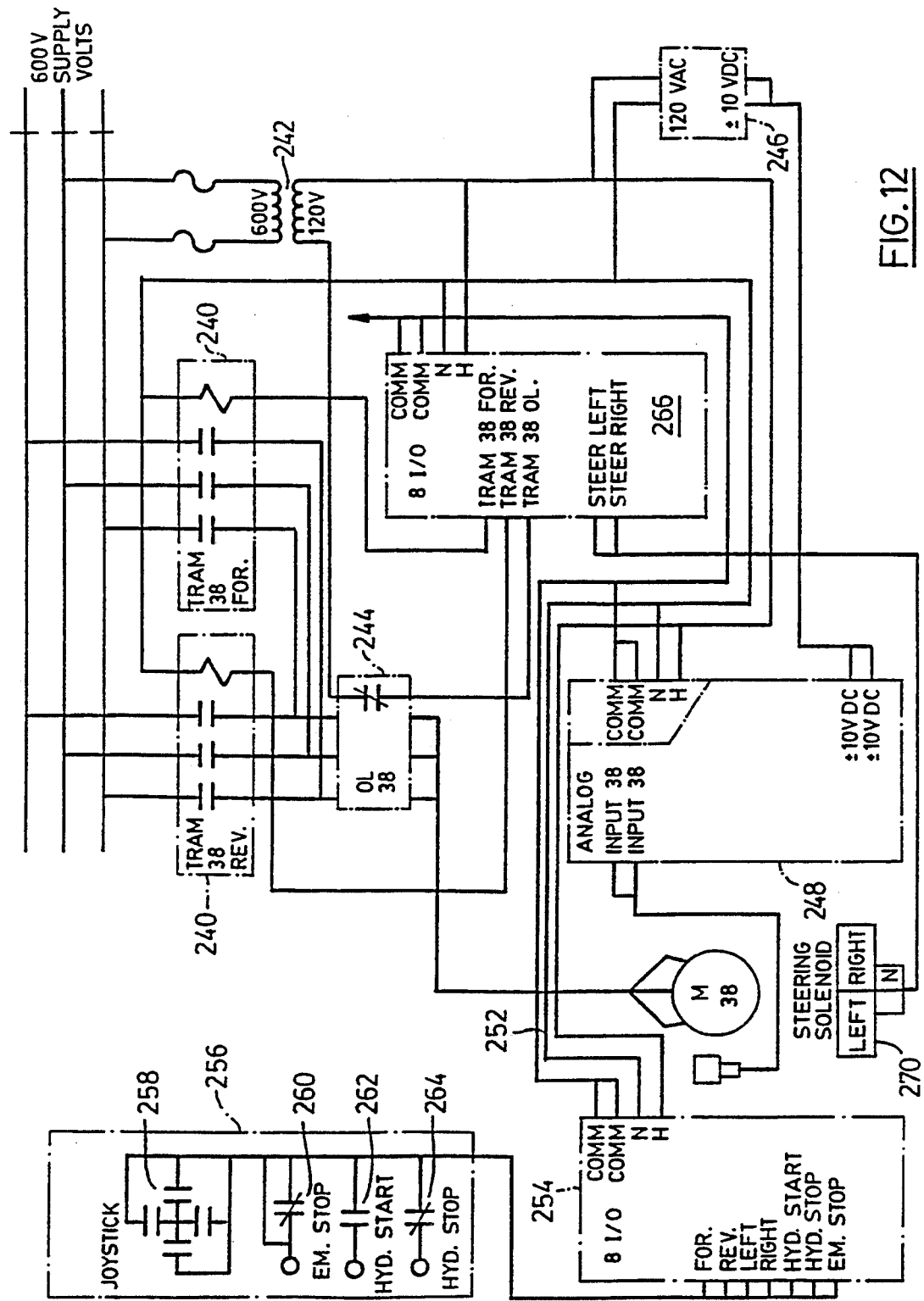
FIG. 12 is an electrical circuit diagram showing the electrical controls for steering the loading car.

FIGS. 10 to 12 of the drawings illustrate the electrical control system for the unloading car, the intermediate car, and the loading car respectively. There are shown in FIG. 10 five contactors 180, two of which are for the front pair wheels 60 on the unloading car and two of which are for the rear pair wheels 74. These contactors are electrically connected to a 600 volt power supply in a preferred embodiment. This power supply is also connected to transformer 182 which converts the 600 volt supply to 120 volts. The line providing 120 volt power is connected to the PLC indicated at 184. In a preferred embodiment the PLC includes a genius bus controller, a nine slot-rack, a central processing unit and a power supply, all of which are available from General Electric. The central processing unit can be type 731 from General Electric. The 120 volt power is also connected by line 186 to an input/output block 188. The block 188 is connected by line 190 to pendant control 192. The pendant control comprises a joystick mechanism 194, an emergency stop button 196, a three-position selector switch 198, a start button 200 and a stop button 202. A second input/output block 204 is connected between the pendant control 192 and an analog block 206 by three electrical lines indicated at 208. Also connected to analog block 206 is a 120 VAC/±10 VDC power supply 210. Connected between the PLC 184 and the contactors 180 is a further input/output block 212. Also connected between the block 212 and the contactors are three overloads 214. There are connected to each of these overloads an electric motor identified by the letter M. The motor M 60 drives the wheels 60, the motor M 74, and the motor M HYD drives the hydraulic motor for the unloading car.

There are also shown in FIG. 10 two steering solenoids indicated at 216, each of which is electrically connected to input/output block 204. These solenoids are capable of steering the pairs of wheels 60 and 74 either right or left as indicated. Connected to the analog block 206 are two Temposonic LDTs 218, one for reading the current steering angle of the wheels 60 and the other for reading the current steering angle of the wheels 74.

The control mechanism for an intermediate car in the train is shown in FIG. 11. In the system, there are two electrical contactors 220, each of which is connected to a supply of 600 volt power. This power is also connected to a transformer 222 capable of converting the 600 volt power to 120 volts. The 120 volt supply is connected to an overload 224 at one end and to a further power supply 226 at the other end. The supply 226 is capable of providing ±10 volts direct current to an analog block 228. The block 228 which is available from General Electric, is connected to a Temposonic LDT 230 which is provided to indicate the current steering angle of the wheels 52 of the intermediate car. There is also a steering solenoid 232 which is connected by line 234 to an input/output block 236. This block is connected to both the 120 volt power supply and to the contactors 220. The overload 224 is connected to the electric motor M 52 (also identified by reference 84 in FIG. 1) used to drive the wheels 52 of the intermediate car.

FIG. 12 illustrates the electrical control circuitry for the loading car of the train. Again there are two contactors 240 which are connected to a 600 volt power supply. The 600 volt supply is connected to a transformer 242 which is capable of converting the 600 volt supply to 120 volts. One side of the 120 volt supply is connected to an overload unit 244 which is available from Siemen's. The other side of the 120 volt supply is connected to a further power supply 246 which is capable of providing ±10 volts direct current. The power supply 246 is connected to analog block 248. This block is connected at one side to a Temposonic LDT 250 which is provided to measure the current steering angle of the wheels 38 of the loading car. The analog block is also connected by means of lines 252 to an input/output block 254 which in turn is connected to pendant control 256. This pendant control includes a joystick 258, an emergency stop button 260, a start button 262 and a stop button 264. Suitable stop, start and stop buttons are available from Siemen's. The electrical lines 252 are also connected to a further input/output block 266 which is connected to the two contactors 240. The overload 244 is connected to an electric motor M 38 which drives the wheels 38 of the loading car.

Figure 15:
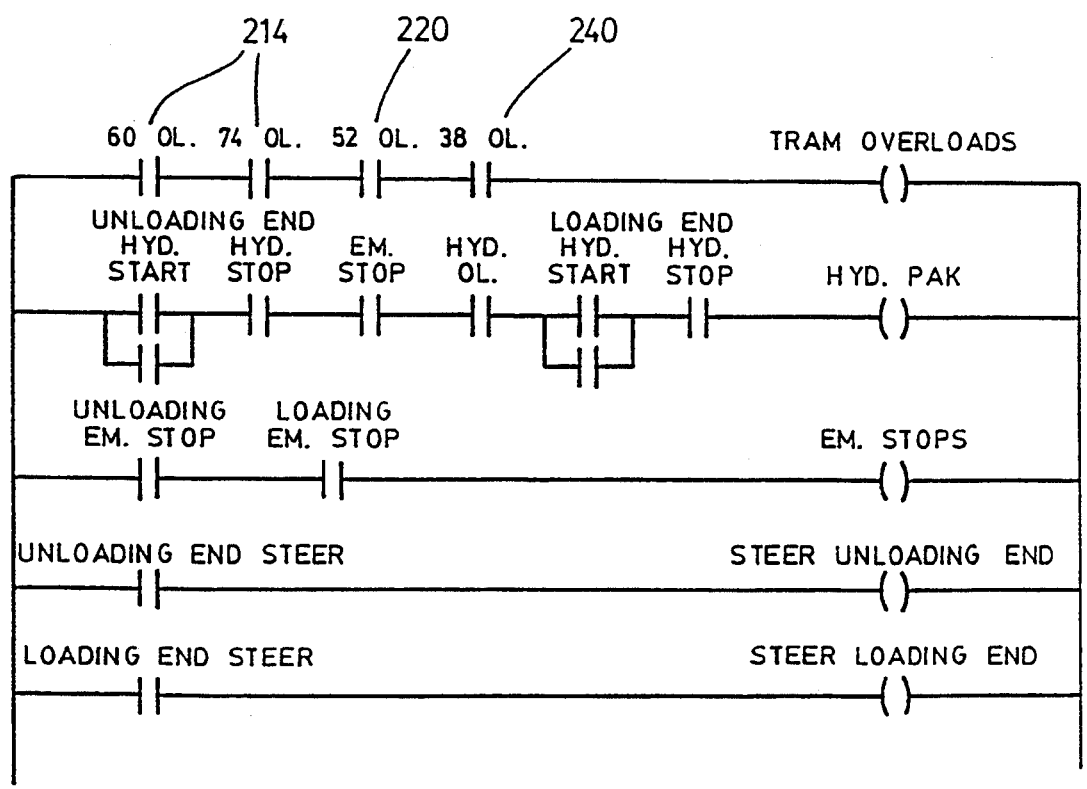
FIG. 15 is the initial portion of a program line diagram explaining the operation of the computer program used in the steering system.

The operation of the electrical control system will now be explained in conjunction with the program line diagrams of FIGS. 15 to 17. The aforementioned thermal overloads 214, 220 and 240 are provided to stop the tramming motors if any one of the motors are loaded beyond their amperage rating. The contact on the overload will open in an overload situation, thus stopping power from going to the tram overload input of the genius bus controller of the PLC. This in turn stops power from going to the tram overload internal coil in the PLC, stopping any tramming function of the machine.

It will be understood that the hydraulic pump of the machine must be running before the machine will tram or steer. This pump may be started or stopped from either the loading end or the unloading end. As indicated, there are start and stop buttons 200, 202, 262 and 264 at both ends of the train. One of the hydraulic start buttons is pushed and completes an input to the PLC which in turn completes an output to the hydraulic pump magnetic starter and the pump starts. Also both the loading and unloading cars have emergency stop buttons 196 and 260. If either of these buttons is pushed, the button completes an input in the genius bus controller thereby sending a signal to the PLC which turns on internal coils stopping all functions of the machine.

The unloading car also has the selector switch 198 which is used by the operator to select which end of the train has control of steering. When the switch is in the "unloading end steering" position, it completes an input to the genius bus controller which sends a signal to the PLC to energize an internal coil therein in this way, only the joystick at the unloading end controls the machine.

The loading car joystick 258 has control of the machine if the selector switch 198 is moved to the "loading end steer" position. Again, a signal will be sent to the genius bus controller completing an input to the PLC.

The following is an explanation of how the machine is steered when the selector switch 198 is moved to the "unloading end steer" position. If the joystick 194 is moved to the forward position, it completes an input to the genius bus controller (hereinafter referred to as the "genius block") which sends a signal to the PLC 184 to energize an internal coil. This operation is illustrated at the top of FIG. 16. This movement of the joystick completes all the "unloading end forward" inputs thereby starting the tram magnetic starters for all of the axles including illustrated axles 60, 74, 52, and 38. The machine moves forward toward the unloading end direction.

The joystick is moved to the left in order to steer the unloading car to the left. The movement completes the unloading left input to the genius block which sends a signal to the PLC which in turn turns on the steer left 60 internal coil. The internal coil outputs a signal to the axle 60 solenoid 216 which moves the wheels 60 to the left. When the joystick is returned to the centre position, the wheels 60 stop turning left. Then the LDT 218 for the wheels 60 reads how far the wheels have turned and sends this information by means of an electrical signal to the input of analog block 206. This block transmits the signal to the PLC 184 where it is stored for the purpose of steering the subsequent axles as explained hereinafter. The first steering location may be called location No. 1.

After the machine has trammed forward for T seconds, a retentive internal timer in the PLC sends a signal to coil steer 74 which is energized, thereby sending a signal to the solenoid 216 which steers the wheels 74. This signal is sent through input/output block 204. The solenoid is energized until it reaches the same position that solenoid 216 for the wheels 60 was in at location No. 1. At this position, the solenoid 74 will quit turning the wheels left because the LDT 218 for the wheels 74 senses the same angle that the wheels 60 had at this location.

When the machine has trammed ahead for another T seconds, the retentive internal timer energizes internal coil steer 52 which energizes the solenoid 232, thereby moving the wheels 52 to the same angle that the first wheels 60 had at location No. 1. Again, when the wheels 52 are turned to the required angle, the LDT 230 senses this angle and sends an input through analog block 228 to the PLC, resulting in coil steer 52 being de-energized.

Assuming for the moment that there is only one intermediate car and the wheels 38 are the next wheels in a series of wheels, then after the machine has trammed forward another T seconds, the retentive internal timer will energize coil steer 38 which energizes the solenoid 270. The wheels 38 are then moved to the same angle that the wheels 60 had at location No. 1. When the wheels 38 have reached the proper steering angle, the LDT 250 which measures this angle sends an input signal to analog block 248 which sends a signal to the PLC which in turn de-energizes coil steer 38. This sequence of steps is indicated at 272 in FIG. 16.

In the alternative, if one wishes to move in reverse, the joystick 194 is moved to the reverse position, thus causing "unloading reverse" input to be energized at the genius block. This sends a signal to the PLC energizing the "unload tram reverse" coil. As a result, the reverse tram coils for wheels 60, 74, 52, and 38 are energized and the tram reverse magnetic starters operate to cause the machine to tram in a reverse direction from the unloading end.

When the joystick 194 moves to the reverse position at the unloading end, the LDT 250 records the position of the wheels 38 and sends this information as an input to the analog block 248 which sends it to the PLC to be stored for the new location No. 1. When the machine has trammed in a reverse direction for T seconds, the retentive internal timer sends a signal to internal coil steer 52 which is energized sending a signal to solenoid 232 through the input/output block connected thereto. The solenoid 232 is energized until its wheels reach the same position that the wheels 38 were in at new location No. 1. The solenoid 232 is de-energized when the LDT 230 senses the same angle that the LDT 250 had at new location No. 1.

When the machine trams reverse for another T seconds, the retentive internal timer is energized sending a signal to internal coil steer 74. This internal coil steer is energized allowing solenoid 216 to be powered through the input/output block 204. The solenoid 216 is energized until its wheels reach the same position that the wheels 38 had at new location No. 1. The solenoid 216 is de-energized when the LDT 218 senses the same angle that the LDT 250 had at new location No. 1.

Again, assuming that there is only one intermediate car, when the machine trams reverse for another T seconds from the unloading end, the retentive internal timer will be energized and will send a signal to internal coil steer 60. The internal coil steer is energized allowing the steering solenoid 216 for the wheels 60 to be powered through the input/output block 204. This solenoid 216 is energized until its wheels 60 reach the same steering angle that the wheels 38 had at new location No. 1. The solenoid 216 is de-energized when the associated LDT 218 senses the same angle that the LDT 250 sensed at new location No.1. This sequence of steering operations for reverse direction movement is indicated at 274 in FIG. 16.

Figure 16:
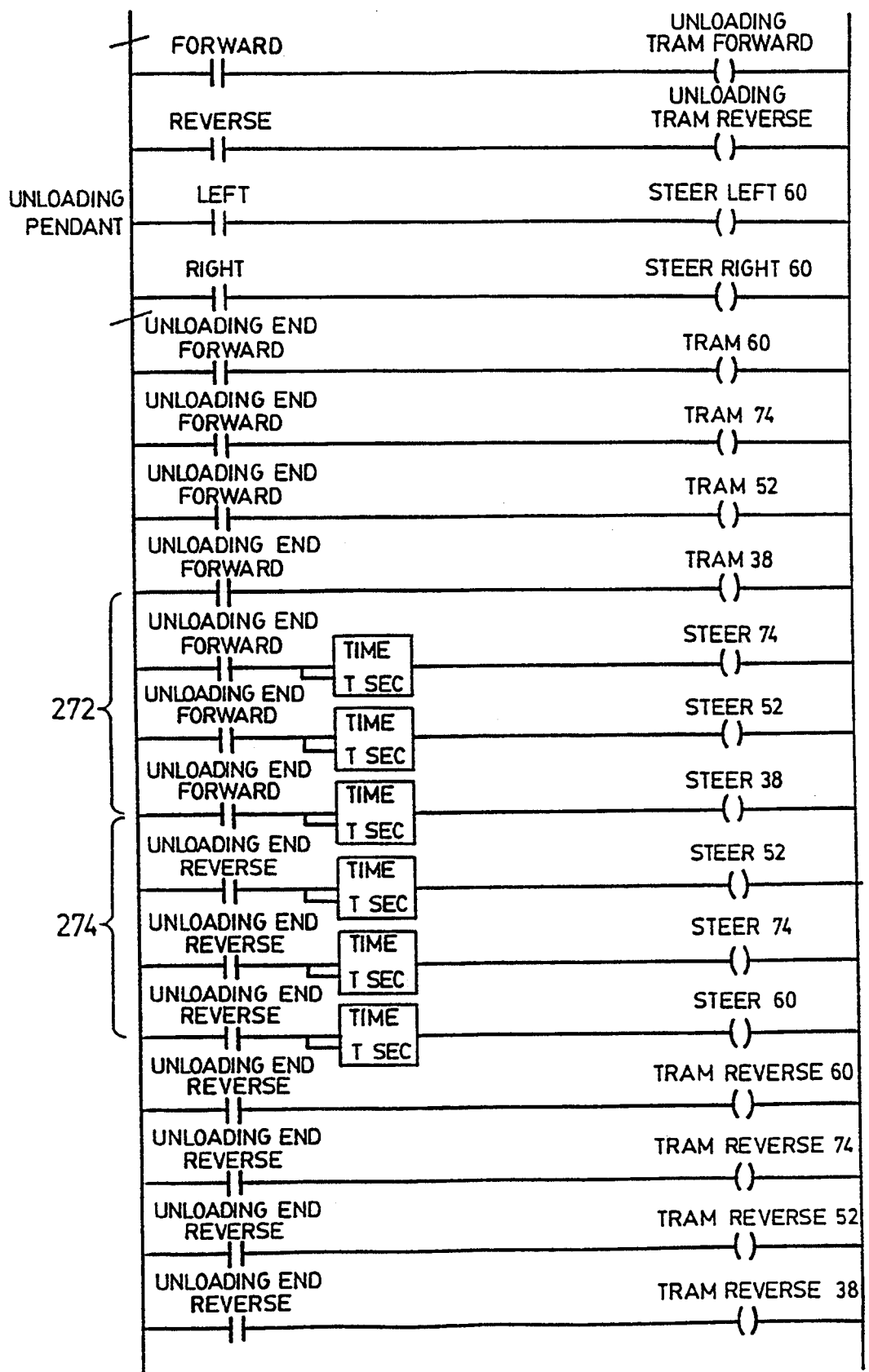
FIG. 16 is a continuation of the program line diagram of FIG. 15.
Figure 17:
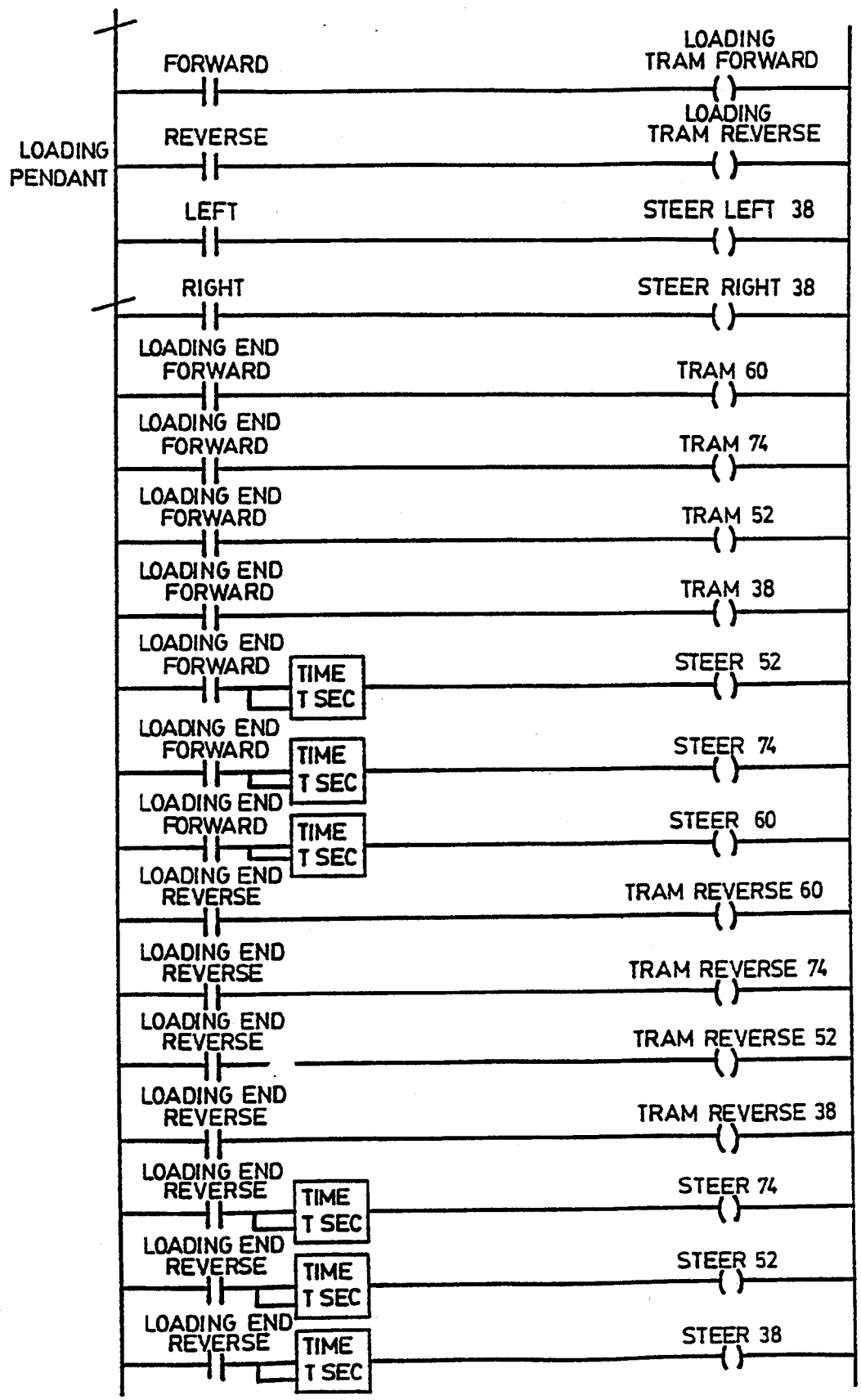
FIG. 17 is the completion of the program line diagram of FIGS. 15 and 16.
Figure 20:
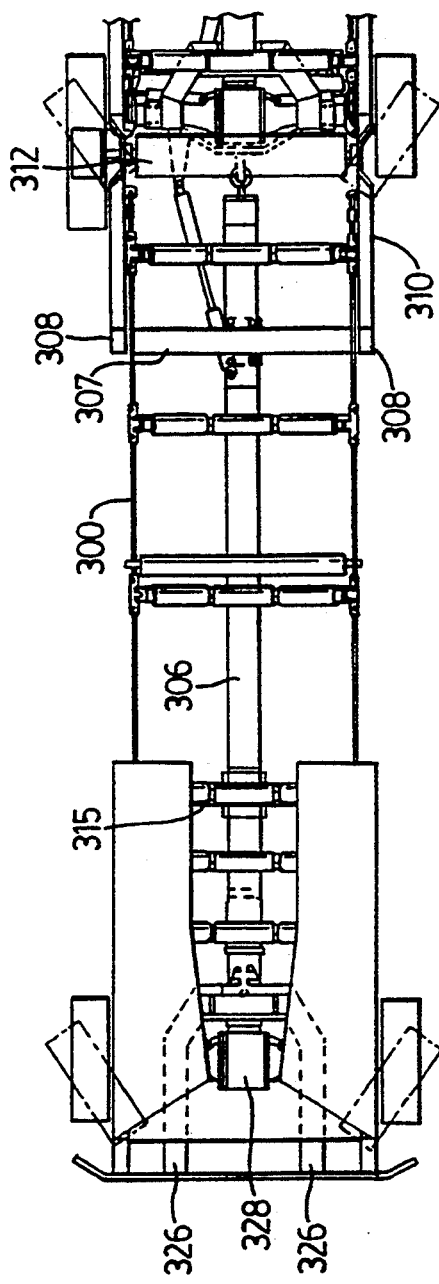
FIG. 20 is a plan view of the rear end loading car of FIG. 18.

FIGS. 17 illustrates the same sequence of events as FIG. 16 except that the train is being steered by the joystick located on the loading tram.

In one embodiment of the steering system there is a manual override for moving and steering each car on the train. If a steering or tracking error should occur, each car can be steered and moved independently of all other cars for realignment. Upon movement of the whole machine, the normal steering sequence is utilized with the manually re-aligned car in an adjusted path. When the manual override is used, each car is steered and moved with manual controls (of known construction) located on that car. For example, a push button control panel 161 can be provided on each intermediate car and a further push button control panel 163 can be provided on the front car for purposes of this manual override feature. Each panel 161 has four push buttons 280 to 283, two of which are for steering the wheels either left or right. The other two buttons are for forward and reverse drive. The location of these four buttons in the control circuit is shown in FIG. 11. The control panel 163 for the front car has six push buttons 285 to 290 illustrated in FIG. 10. The buttons 285 and 286 are for steering the wheels 60 either left or right while buttons 287 and 288 are for steering the wheels 74 either left or right. The control buttons 289 and 290 are for forward or reverse drive.

Figure 21:
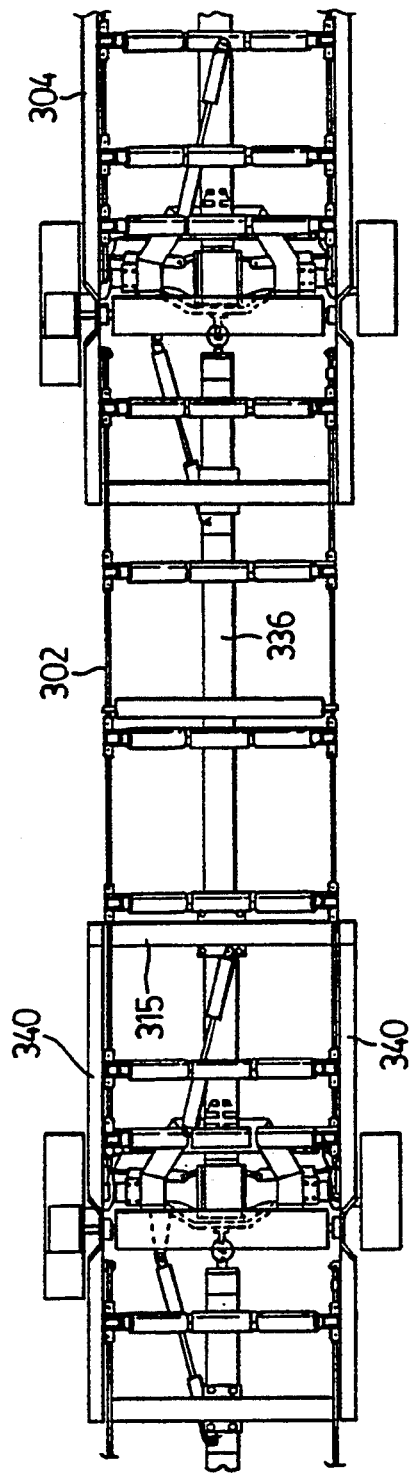
FIG. 21 is a plan view of the intermediate car shown in FIG. 19.

A preferred embodiment of the conveyor system of this invention will now be described with particular reference to FIGS. 18 to 24 of the drawings. Except as specifically described hereinafter, this preferred system is constructed in a similar manner to the embodiment illustrated in FIGS. 1 to 5 and operates in a similar fashion. In this preferred system, there are also three different types of cars or vehicles pivotally connected together in the train. These cars include a rear end car 300 which is a loading car and an intermediate car 302, a complete view of which is shown in FIGS. 19 and 21. As with the first embodiment, these intermediate cars 302 make up most of the train. The third type of car or vehicle in the system is the front end car 304 which is similar in construction to the unloading car 22 of the first embodiment except for the differences noted hereinafter in connection with the cars or vehicles 300 and 302.

The rear end car 300 has a horizontally extending, centrally located main frame 306 near the front end of which is connected a horizontally extending, transverse frame 307 which is connected by bolts to the top of the main frame. Extending upwardly from opposite ends of frame 307 are two frame sections 308. Extending forwardly from each section 308 at a slight incline is a forward conveyor support frame 310. At the front end of the frames 310 there is mounted a conveyor roll 312. A pivot device 311 described in further detail hereinafter is located at the front end of a main frame 306 and is just to the rear of the axle for the pair of wheels 314 of the adjoining intermediate car.

Located neap the rear end of the main frame 306 is a horizontal, transverse frame member 315 which is bolted to the main frame. Extending upwardly from opposite ends of the frame member 315 are two frame sections 316 which are shorter than the frame sections 308 in order to provide the desired incline to conveyor 318. Extending rearwardly from each frame section 316 is a rear conveyor support frame 320. Near the rear end of the frames 320 is rotatably mounted rear conveyor roller 322. The rear ends of the frames 320 are supported by short vertical frames 324, the bottom ends of which are connected to the main frame 306 by two horizontally extending rear end frame members 326 to which rear axle 328 is bolted. It will be understood that in the rear end Car 300 the axle 328 is not free to pivot about a vertical pivot axis relative to the main frame of the vehicle unlikely the axles of the intermediate cars 302 described hereinafter. The frame 306 is split near its rear end to accommodate electric tram motor 331. Extending below the motor is a lower, horizontal frame extension 332 while above the motor is an upper horizontal frame extension 334.

Turning to the construction of each of the intermediate cars 302, these cars also have a central, horizontal main frame 336. The conveyor 338 is supported on the intermediate car in a similar manner to the supporting arrangement for the conveyor 318. However in the intermediate car, the two rear conveyor support frames 340 extend rearwardly and slightly upwardly as shown in FIG. 19 and they are not supported at the rear end.

Figure 22:
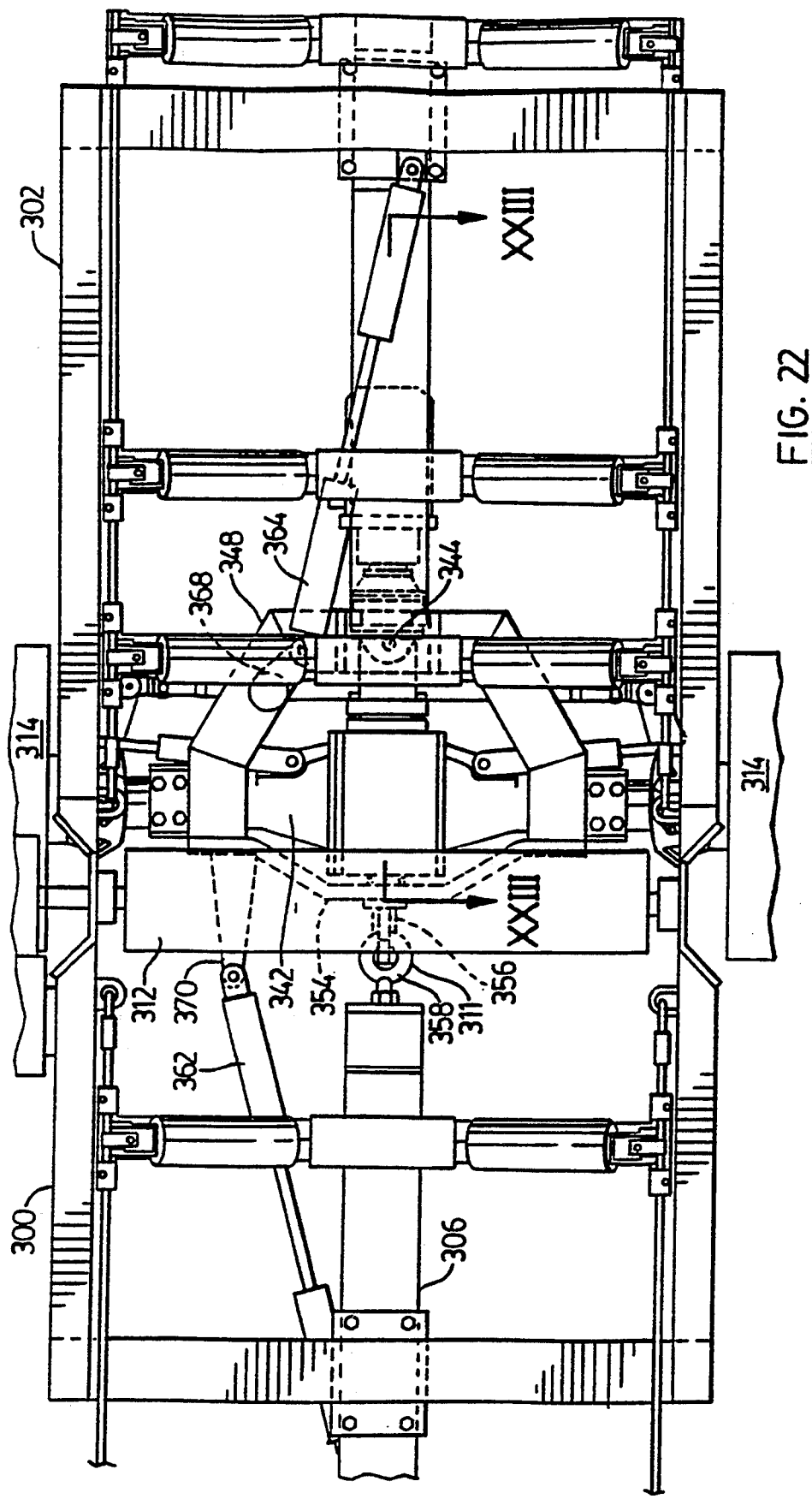
FIG. 22 is a detail plan view of the pivotable axle arrangement used at both ends of the intermediate car of FIG. 19.
Figure 23:
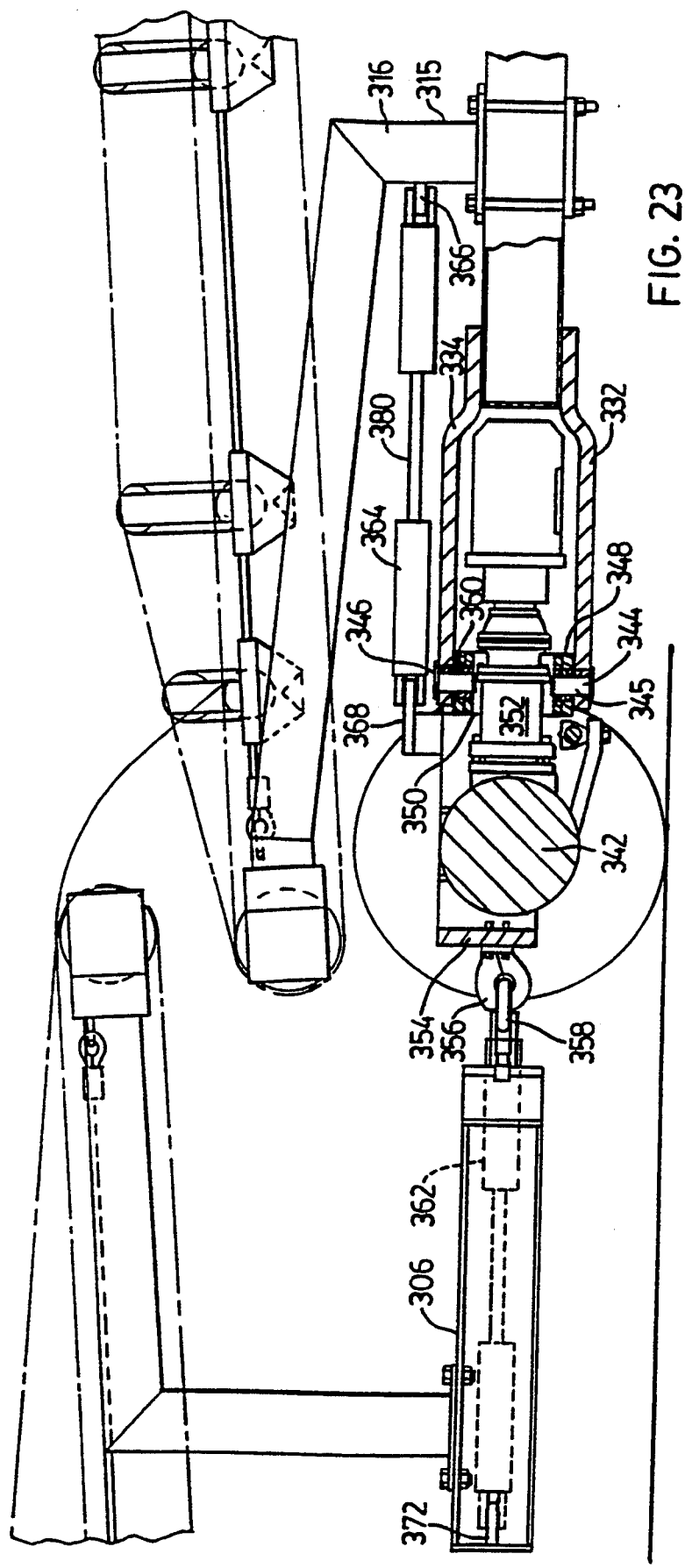
FIG. 23 is a detail elevational view of the pivotable axle arrangement shown in FIG. 22, which view is partly in cross-section along the line XXIII—XXIII of FIG. 22.

FIGS. 22 and 23 illustrate in detail the axle support arrangement for each intermediate car 302 and for the rear end of the front end car 304. Reference will be made to the axle support for the wheels 314 but it will be understood that the wheels of the other intermediate cars and the wheels at the rear end of the front end car are mounted in a similar fashion. The pair of wheels 314 are mounted on their own axle 342. It will be understood that the axle per se is the same type of axle as used in the first embodiment of FIGS. 1 to 5. However the axle 342 is pivotally connected to the adjoining vehicles, in this case rear end car 300 and intermediate car 302, by a front pivot device 344 and a rear pivot device 311, each of these devices providing a vertical pivot axis. The front pivot device 344 is located close to and forwardly of its respective axle and rear pivot device 311 is located close to and rearwardly of the axle 342. As illustrated the front pivot device 344 comprises lower and upper pivot pins 345, 346 which are mounted respectively in lower and upper frame extensions 332 and 334. These pivot pins extend through holes formed in a subframe 348. The axle 342 is rigidly mounted to this subframe which has a square hole at 350 through which the axle drive 352 extends. The rear end of this subframe 348 is provided by horizontally extending frame 354. On the rear surface of the frame 354 is mounted a pintle hitch 356 which forms part of the rear pivot device 311. The other half of this pivot device is formed by a tow ring 358. A suitable form of pintle hitch is that sold by Holland Hitch Co. under model no. PH-T-60-A0L-8. A suitable form of tow ring is that sold under the trade name Princess Auto model no. 3807195. It will be understood that the pintle hitch in a known manner enables the two adjoining vehicles or cars to be detached readily from one another, if desired.

Preferably, the pivot pins 345 and 346 are mounted in ball bushings indicated at 360 to permit the subframe to pivot freely. A suitable ball bushing is that sold by Torrington, model no. 20SF32.

In the preferred steering system illustrated in FIGS. 22 and 23, there are means for locking the axle 342 in a position at right angles to the longitudinal centre line of either the vehicle immediately in front of the axle or the vehicle immediately to the rear thereof. The preferred locking mechanism for each axle comprises first and second hydraulic cylinder mechanisms 362 and 364.

The first mechanism 364 is capable of preventing pivotal movement about the front pivot device 344 while the second mechanism is capable of preventing pivotal movement about the rear pivot device 311. Each hydraulic cylinder mechanism 362 and 364 is preferably double headed and is constructed in the manner illustrated in detail in FIG. 24. The front end of the mechanism 364 is pivotally connected to horizontal frame 315 by means of a lug 366. The rear end of a mechanism 364 is pivotally connected to the axle and axle subframe 348 by means of connecting lug 368. The front end of the mechanism 362 is pivotally connected to the axle 342 by means of a rigid connecting arm 370 which extends rearwardly from the axle subframe. The rear end of the mechanism 362 is pivotally connected to the main frame 306 by means of lug 372.

Figure 24:
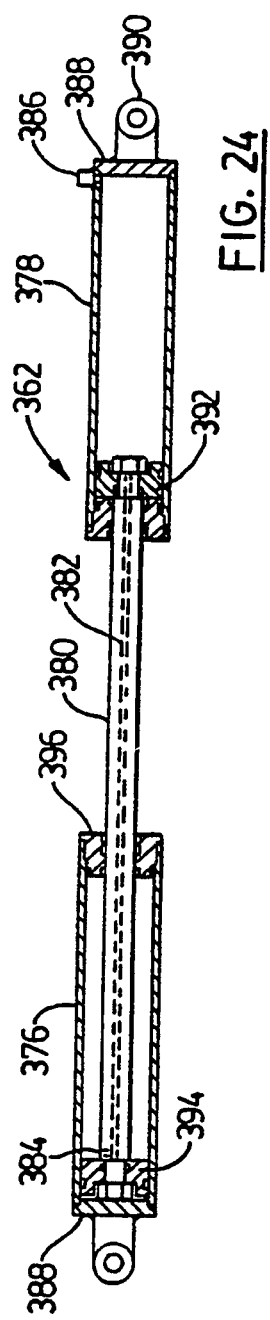
FIG. 24 is a longitudinal cross-sectional detail of a double headed hydraulic cylinder mechanism employed in the pivotable axle arrangement of FIG. 22.

The construction of the hydraulic cylinder mechanism 362 is detailed in FIG. 24 and it will be understood the mechanism 364 is constructed in a similar fashion. The mechanism includes a left cylinder portion 376 and a similar right cylinder portion 378 and these cylinder portions are connected together by means of a common rod 380 which has an oil channel 382 extending along its central axis for most of its length. This oil channel provides hydraulic oil to the left cylinder portion 376 by means of a short end passage 384. The hydraulic oil enters the right cylinder portion 378 through an oil port 386 which of course connects to a suitable hydraulic hose (not shown). The outer ends of both cylinder portions are closed by circular end plates 388. On these plates are mounted a connecting extension 390 having an opening for a pivot pin. On each end of the rod is mounted a piston 392, 394 adapted to slide in its respective cylinder portion. The inner end of each cylinder portion is fitted with an annular closure 396 having a central opening through which the rod is free to slide. Suitable hydraulic oil seals are provided in each member 396 and about each piston in a known manner. The hydraulic cylinder mechanism 362 is shown in FIG. 24 in the pressured or locked position. It will be understood that each hydraulic cylinder mechanism moves to this mid-stroke position upon being pressurized. In this position, the axle is locked in a position where it is perpendicular to the centerline of the vehicle to whose frame the hydraulic cylinder mechanism is connected. When the oil port 386 is vented to the hydraulic oil reservoir (not shown), the hydraulic cylinder mechanism is free to extend or retract as the mobile conveyor moves along the ground. The left cylinder portion 376 locks in position after extension of the rod into this portion while the right cylinder portion locks in position after retraction of the rod from the portion 378.

It will be understood that the above-mentioned PLC 184 also controls the hydraulic cylinder mechanisms 362, 364 for the pivoting axles of the mobile conveyor.

It should be understood that the wheel pairs in the preferred conveyor system illustrated in FIGS. 18 to 23 are steered in the same manner as in the first described embodiment and the mechanism for pivoting each wheel about its vertical axis is the same. In the illustrated preferred embodiment of FIGS. 18 to 23, the wheel pairs are located as close as possible to the material trajectory landing point. Thus, as shown in the drawings, the axle for each pair of wheels is almost directly below the unloading end of the conveyor located immediately to the rear of that axle.

In the mobile conveyor of FIGS. 18 to 23, when the mobile conveyor is moving rearwardly, that is in the direction of rear end car 300, the hydraulic cylinder mechanism 362 of the second axle 342 is pressurized causing it to go to its mid-stroke. Thus the second axle 342 i.e. the axle for the first intermediate car or vehicle) is positioned at right angles in plan view to the longitudinal centre line of the rear end car 300. At the same time the cylinder mechanism 364 located in front of the second axle 342 is free to float allowing the axle to pivot about the vertical pivot axis provided by front pivot device 344. The PLC operates the other pivoting axles of the mobile conveyor in a similar fashion when the conveyor is tramming in this rearward direction. However, when the tramming direction is in the forward direction, that is in the direction of the front end car 304, then the hydraulic cylinder mechanism 364 of the second axle 342 is adjusted to mid-stroke forcing this axle to be at right angles to the longitudinal centerline of the intermediate car 302. In this situation, the pintle hitch or rear pivot device 311 will now provide a vertical pivot axis since the hydraulic cylinder mechanism 362 is allowed to float by the PLC. Thus the towing operation for this preferred mobile conveyor can be compared to the situation of towing a boat trailer behind a car. It is well known that it is easier to tow a boat trailer behind a car than it is to back up a trailer using the car (for example when launching a boat). For this reason, the embodiment illustrated in FIGS. 18 to 23 is preferred over that illustrated in FIGS. 1 to 6 of the drawings.

Figure 25:
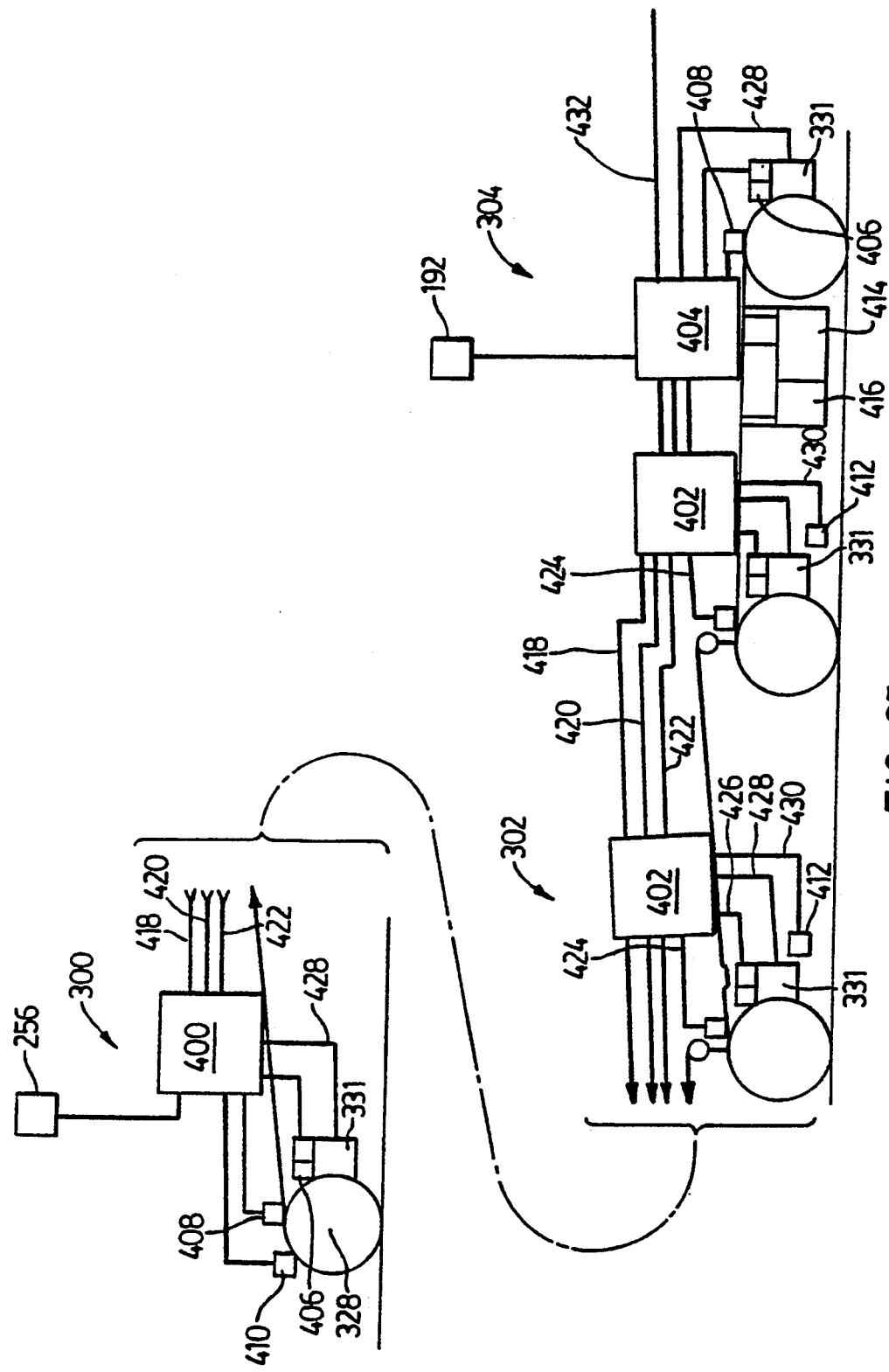
FIG. 25 is a cable and equipment schematic layout for a train comprising the cars of FIGS. 18 and 19, repetitive portions having been omitted for ease of illustration.

FIG. 25 illustrates the cable and equipment layout for the preferred mobile conveyor of FIGS. 18 to 21. Illustrated schematically are the wheels on one side of the rear end car 300, the intermediate car 302 that is immediately to the rear of the front end car, and the front end car 304. Thus, the rear axle of the rear car is indicated at 328. Illustrated schematically in this drawing are the control enclosures containing most of the electrical controls for the mobile conveyor including a main control enclosure 400 mounted on the rear car, an intermediate vehicle control enclosure 402 mounted on each intermediate car and also on the front end car and a main disconnect enclosure 404. Also mounted on the rear car is operator control pendant 256 and a similar operator control pendant 192 is mounted on the front car. Other features illustrated schematically in FIG. 25 are the five horsepower motors 331 that power each pair of wheels, the hydraulic steering valves 406 used to steer each pair of wheels, an axle position sensor 408 and a single optical incremental encoder 410, the function of which is described hereinafter. The encoder is located on the rear end car 300. Also on each of the intermediate cars and on the front end car there is a hydraulic axle shift valve 412. The axle pivot is controlled also by the double headed hydraulic cylinders that is controlled by the four way—two position hydraulic valve 412. This valve has one electromagnetic solenoid 552 (see FIG. 30) to control the flow of hydraulic fluid to the pivoting cylinders. When no power is applied to the hydraulic valve, the axle will lock 90° to the forward (toward loading car) frame and be in the correct geometry for forward travel. When power is applied to the solenoid, the axle will pivot and lock 90° to the reverse (toward unloading car) frame and be in the correct geometry for reverse travel. The axles must be steered such that they are straight prior to pivoting or the tires will skid and will prohibit the axle from pivoting easily.

Mounted on the front end car is a 25 horsepower, 1800 rpm, 575 volt electric motor 414 which is used to drive the main hydraulic pump 416 for the mobile conveyor.

It will be understood that the sensor 408 is an LDT and operates in the manner described above. Another suitable form of LDT is that made by Balluf, Part No. BTL-E160305-Z-S32 provided with a BKS-S33-00 connector. The preferred form of distance measuring device for the mobile conveyor of this invention is the optical incremental encoder 410. One suitable form of this encoder is that manufactured by Allen Bradley, Model No. 845N-SJDN2-CMNI, which encoder has two channel outputs in quadrature and counts at a rate of 500 per revolution of the encoder shaft. This encoder is connected to the input pinion shaft of the rear end car and is able to measure the distance travelled by the amount of rotation of the drive system by measuring the number of clicks produced.

The cables illustrated in FIG. 25 include main power buss 418 carrying 600 volt power, a PLC communication cable 420 and a third cable 422 which carries the 4 to 20 milliamp signals from the transducers (LDT's). A further cable 424 comprises two pairs of wires and leads from each LDT to the intermediate control enclosure 402. One pair of wires provides power to the LDT while the other pair carries signals from the LDT to the control enclosure. Cable 426 connects each intermediate control enclosure to the two solenoids which operate the respective hydraulic steering valve 406. A further cable 428 connects each control enclosure to its respective wheel drive motor and provides 600 volt power thereto. A further cable 430 connects each intermediate control enclosure to its respective hydraulic axle shift valve providing power thereto.

The main disconnect enclosure 404 provides the means for disconnecting from the mobile conveyor a main power supply cable 432.

Figure 26:
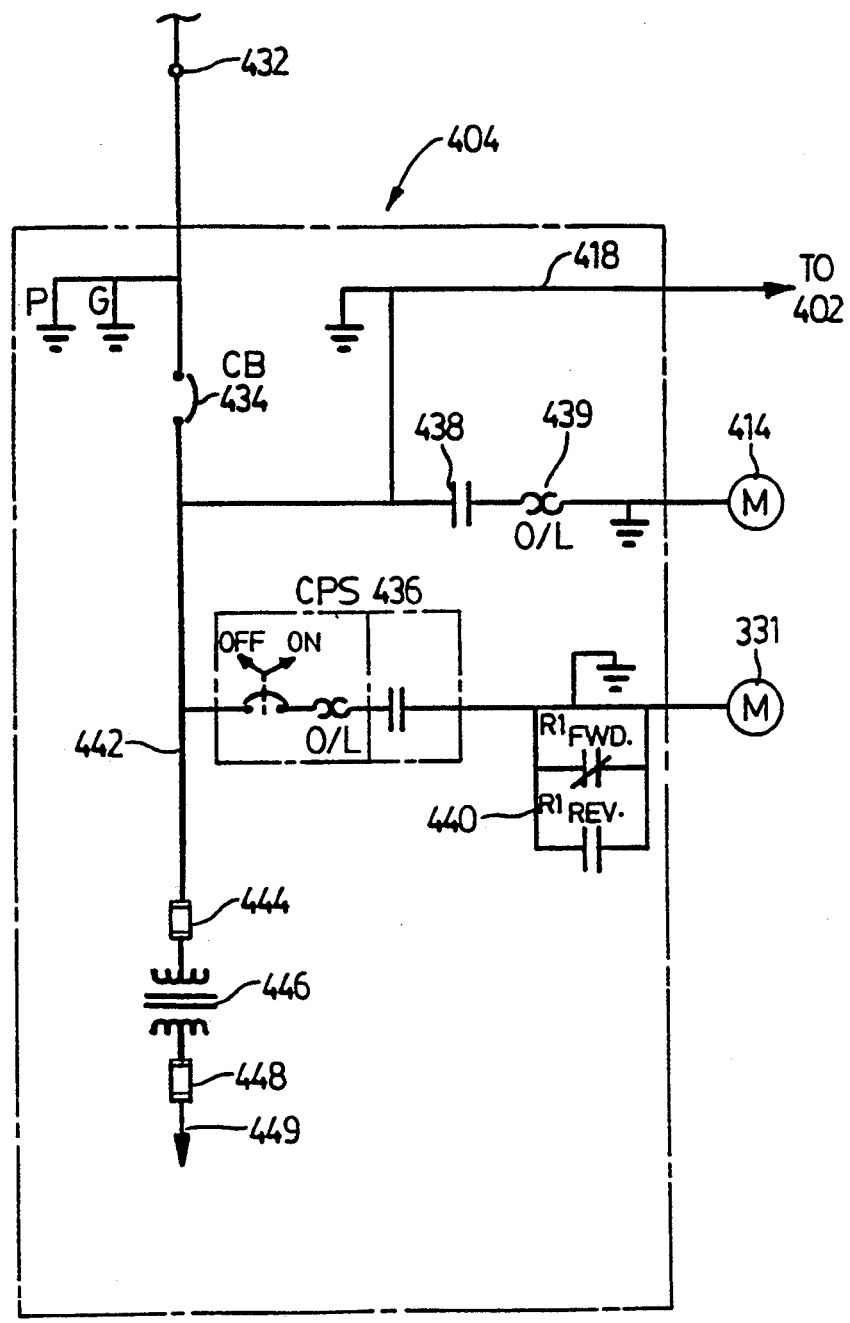
FIG. 26 is a first part of a single line power diagram illustrating the electrical connections between the various control enclosures and a main disconnect enclosure.
Figure 27:
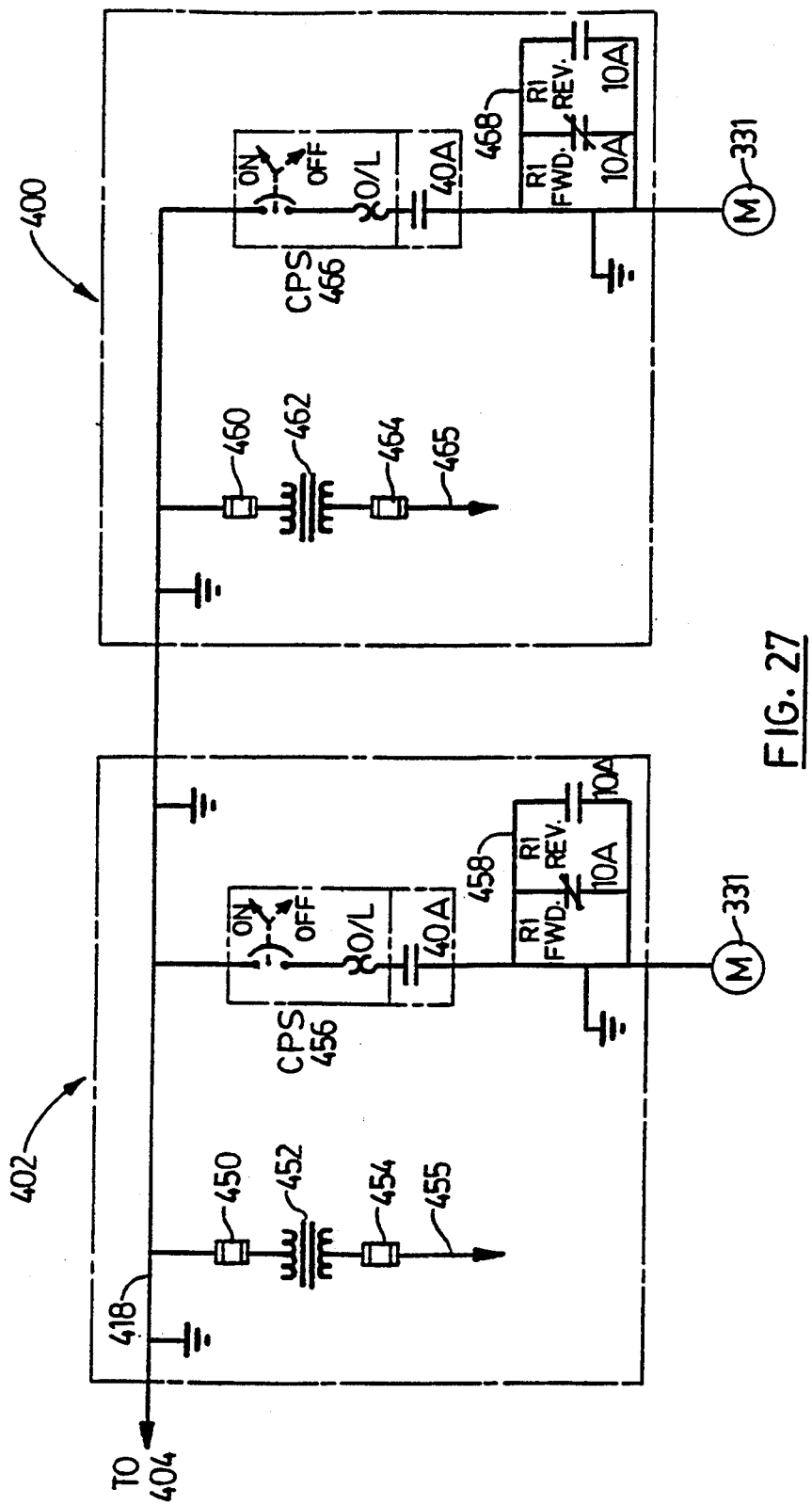
FIG. 27 is the remaining, second part of the single line power diagram.
Figure 31:
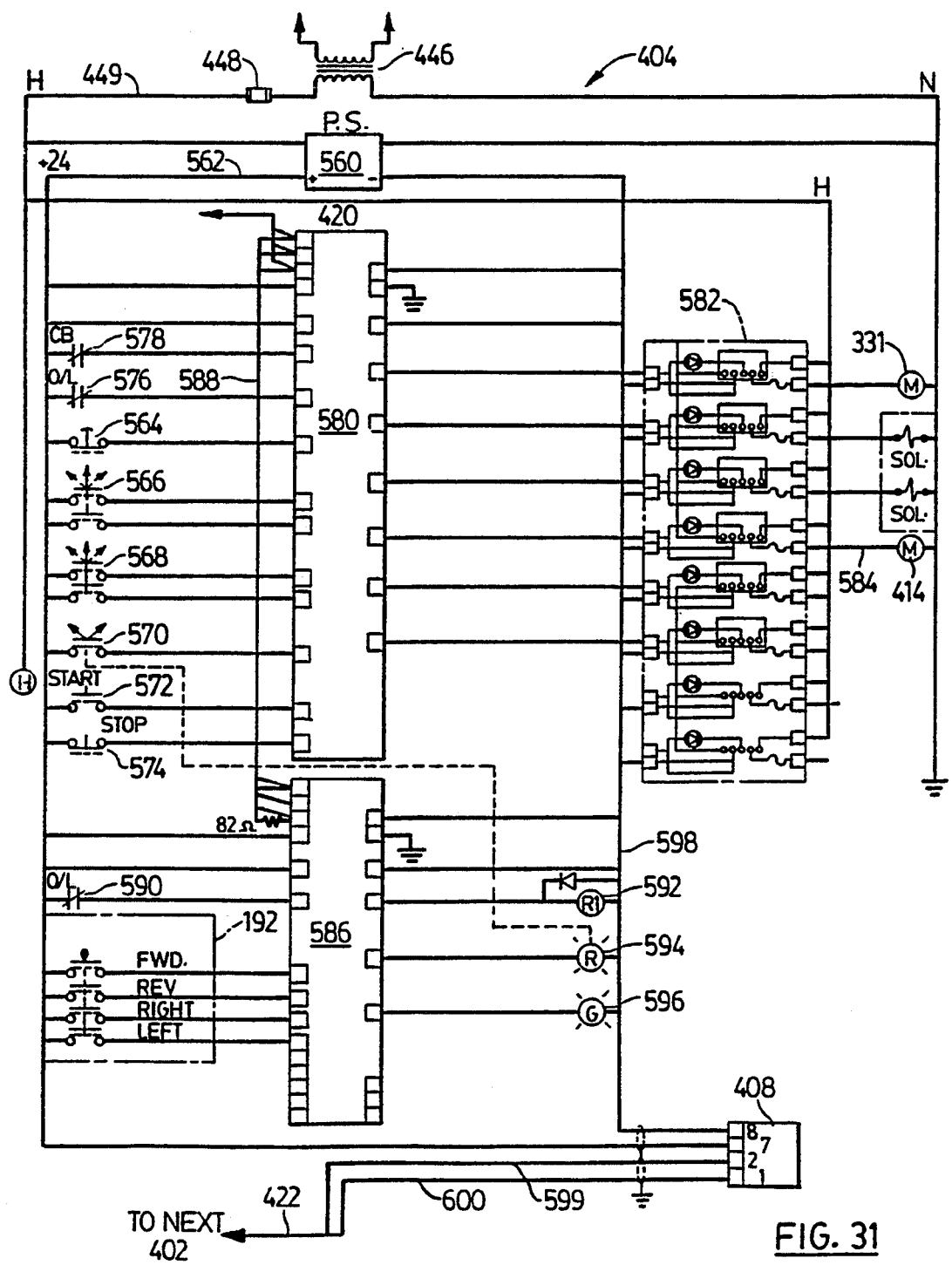
FIG. 31 is a schematic diagram of the electrical circuit and components in a main disconnect enclosure for the mobile conveyor.

FIGS. 26 and 27 together provide a single line power diagram illustrating how the control enclosures are connected and some of the components in these enclosures. FIG. 26, in particular, illustrates schematically the main disconnect enclosure 404 which, as indicated, is connected to the main power supply cable 432 which is preferably connected to a 100 amp circuit breaker. In the disconnect enclosure is a manually operated main disconnect CB switch 434 which is lockable in the off position. This adjustable circuit breaker is set at 500 amps and has an instantaneous trip. This switch is connected to a coordinated protected starter 436. In one preferred embodiment its thermal trip is set at 5.2 amps while its magnetic trip is set at 70 amps. Also, in the enclosure, is motor starter 438 and thermal overload protector 439 which in a preferred embodiment is set at 24 amps and has a manual reset. The motor starter 438 and protector 439 are connected to the hydraulic pump motor 414. The switch 434 is also connected by the main power buss at 418 to the intermediate control enclosure 402 which supplies power to the axle at the rear end of the front end car. The starter 436 is connected to a relay 440 which in turn is connected to the head axle tram drive motor 331. The purpose of relay 440 is to reverse the connections to motor 331 when it is desirable for the vehicle to tram in reverse. It is programmed to change state 0.5 sec. before CPS 436 changes state and thus the relay will not make or break load current. Connected to the switch 434 by line 442 are two 15 amp fuses 444 and a transformer 446 which converts the 600 volt current to 120 volt AC, single phase. The output of this transformer is connected to a third fuse 448 which is a 1.6 amps time delay fuse. This fuse is connected by line 449 to the other electrical control equipment in this enclosure as illustrated in FIG. 31 described hereinafter.

Figure 30:
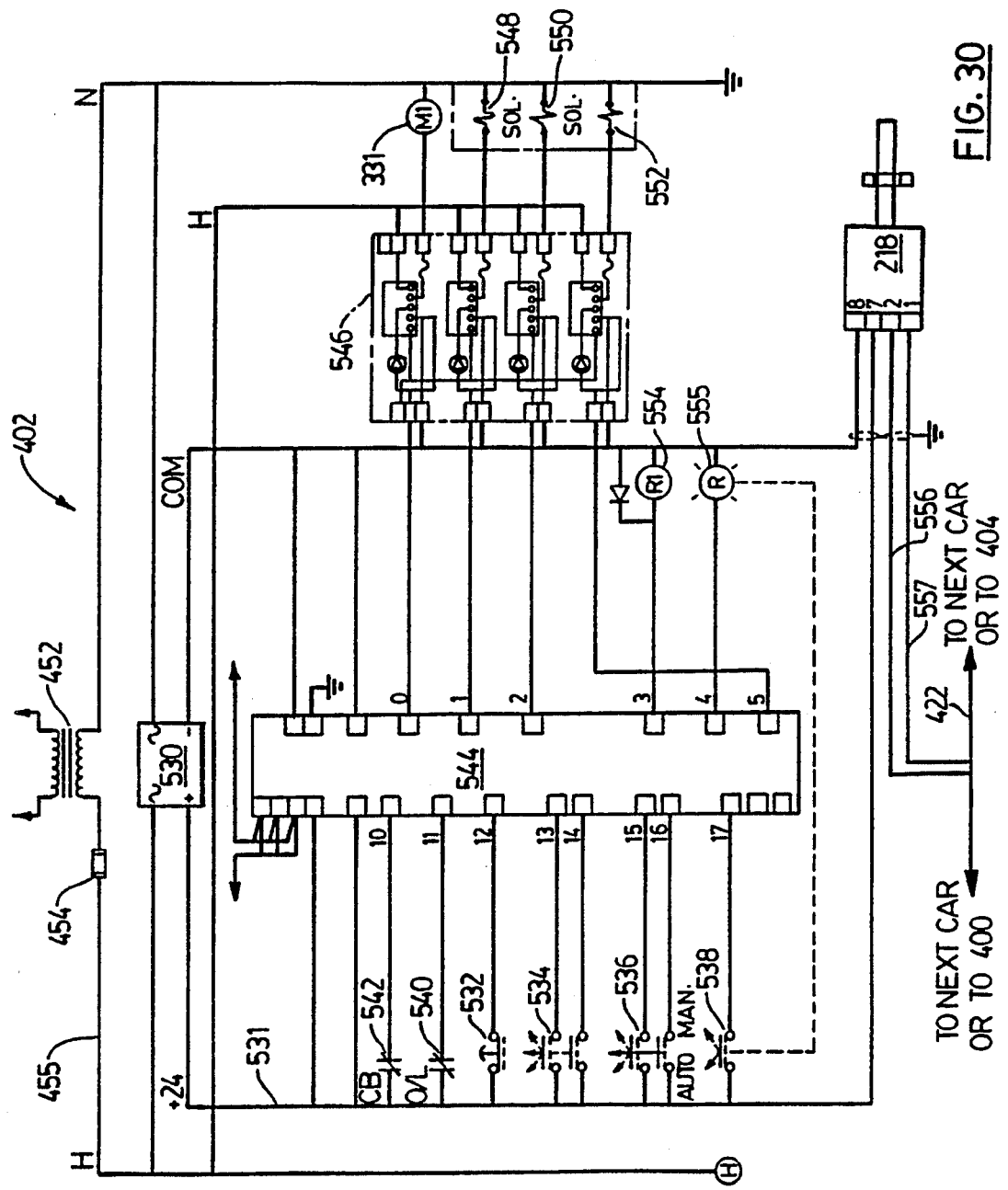
FIG. 30 is a schematic diagram of the electrical circuit and components in a control enclosure for an intermediate car.

Turning now to FIG. 27, there is illustrated a typical intermediate control enclosure 402 and some of the components therein. Connected to the main power buss 418 are two 15 amp fuses 450 which in turn are connected to transformer 452 which is similar to transformer 446. The output of the transformer is connected to fuse 454 which also is a 1.6 amp time delay fuse. This fuse is connected by line 455 to the other control components in the enclosure which are illustrated in FIG. 30. Also contained in enclosure 402 and connected to the power buss is a coordinated protected starter 456 which is similar to CPS 436 and has its trips set at the same setting. The starter is connected to a relay 458 which is in turn connected to tram drive motor 331.

Figure 28:
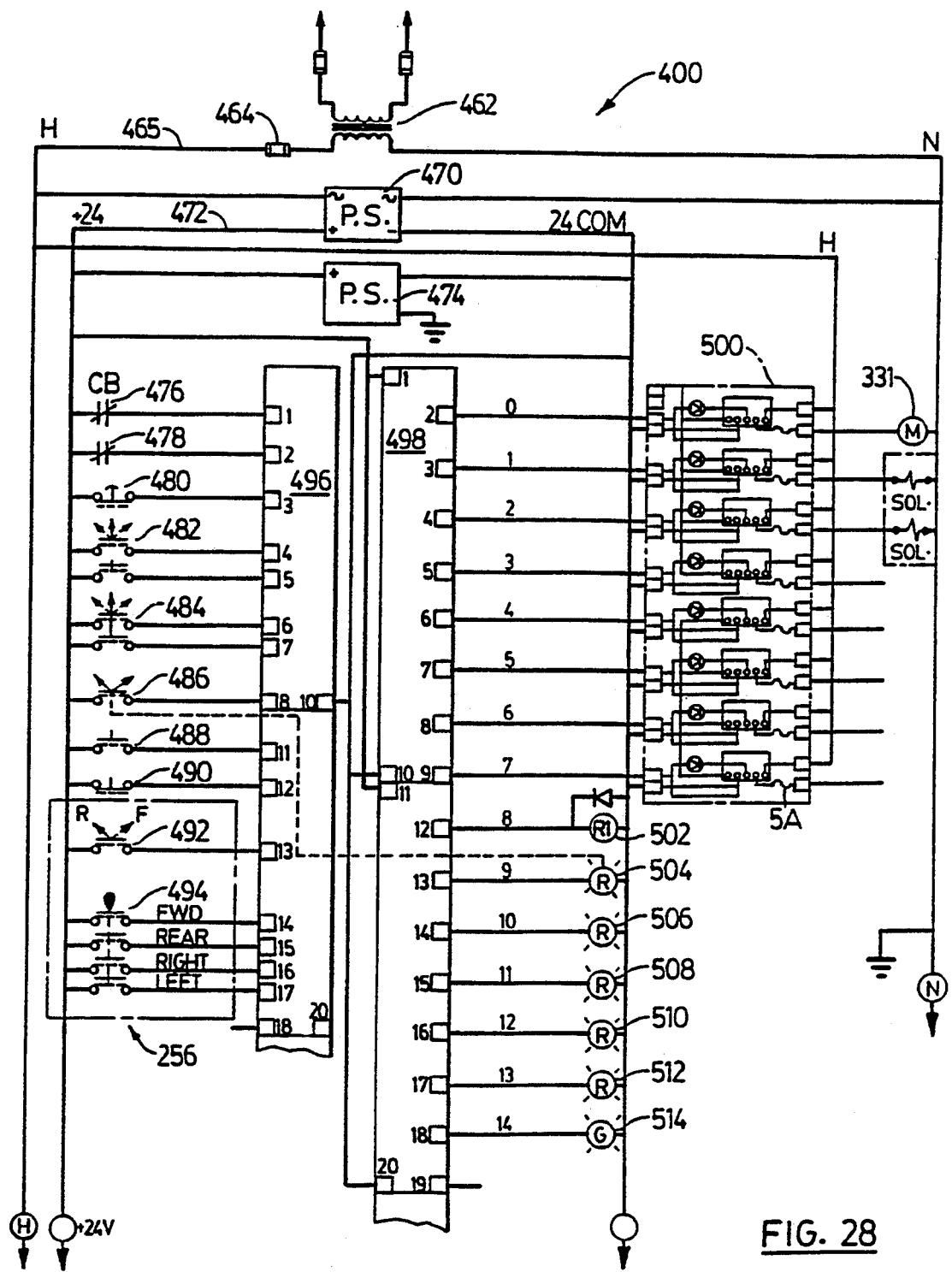
FIG. 28 is a first part of an electrical circuit diagram for the circuitry in the main control enclosure of the mobile conveyor of FIGS. 19 to 21.
Figure 29:
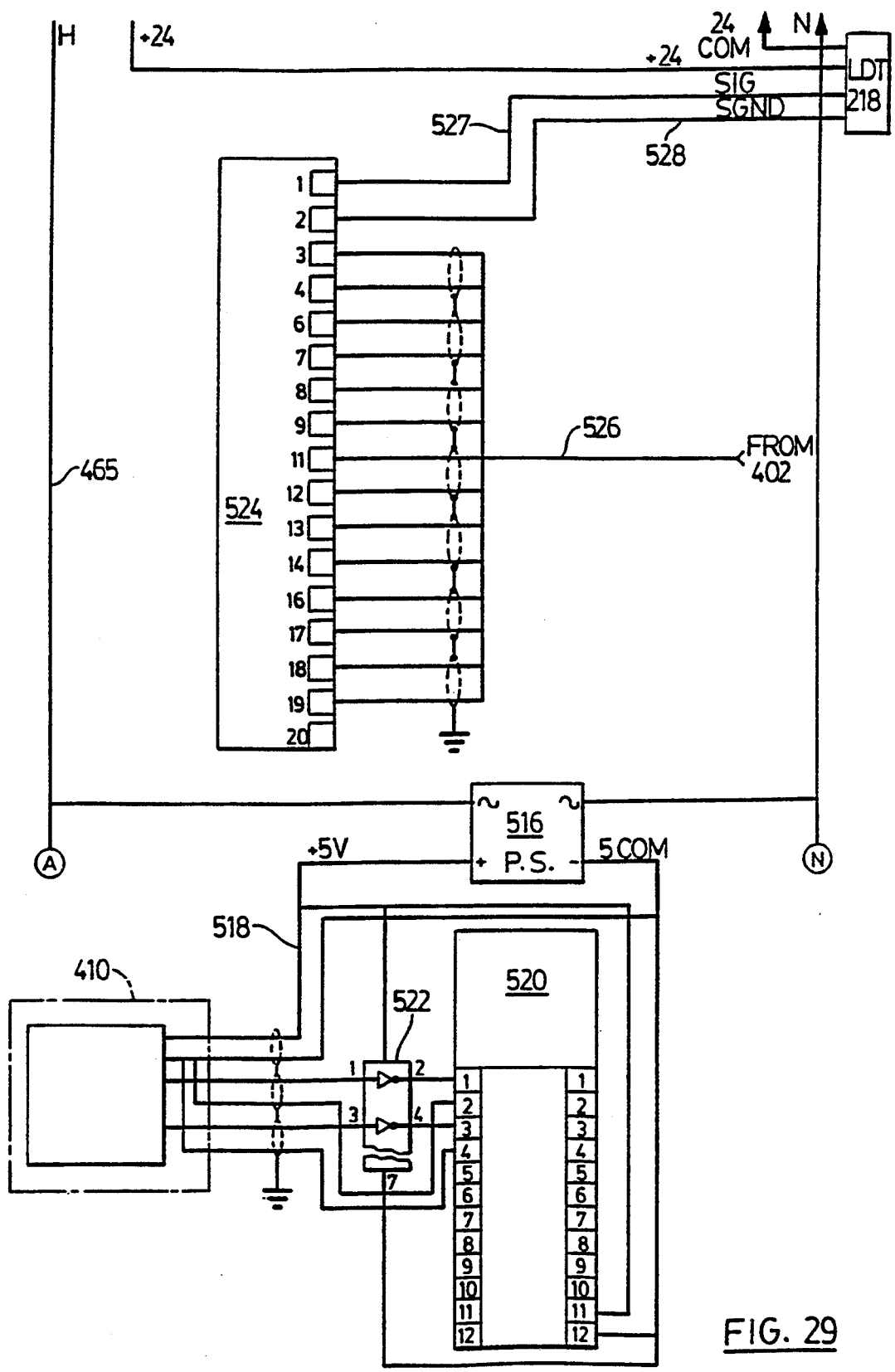
FIG. 29 is the remaining, second part of the electrical circuit schematic for the main control enclosure.

Also shown in FIG. 27 is main control enclosure 400 which is located on the loading car. The power line 418 extends to this enclosure and connects up to two 15 amp fuses 460 which in turn are connected to transformer 462. This transformer operates at 750 VA and coverts 600 volt current to 120 volt alternating current, single phase. It is connected to a fuse 464 which is a 6.25 amp time delay fuse. This fuse is connected by line 465 to the other electrical control components in the enclosure which are illustrated in FIGS. 28 and 29. Also located in the main control enclosure is a coordinated protected starter 466 which is similar to CPS 456. The starter is connected to relay 468 which in turn is connected to the tram drive motor 331 for the tail axle of the rear end car.

Turning now to FIGS. 28 and 29 which illustrate in more detail the contents of the main control enclosure 400, the line 465 is connected to a 24 volt DC, 4.8 amp regulated power supply 470 which provides power through output line 472 to the controls for the rear end car. The line 472 is also connected to another power supply 474 which can be an Allen Bradley 1771-P5 slot power supply. The controls include a circuit breaker auxiliary contact 476 (shown reset) which is part of a coordinated protected starter. If it is tripped, it will indicate to the PLC that it is tripped. Also connected to line 472 is an overload auxiliary contact 478 which is shown reset and which will indicate if the overload is tripped. There is an emergency push button stop 480 which is normally closed and a manual steering selector switch 482 which is used to steer the loading car manually. This is a three position switch with a spring return to center position. Also provided is a manual tramming selector switch 484 which permits manual actuation of the wheel drive of the rear end car (without having to move the whole conveyor train). The switch 484 is also a three position switch with a spring return to center. Also provided is a control selector switch 486 which can be illuminated. This switch permits one to choose between manual and auto control. The manual switches will operate only when the switch 486 is in the manual mode.

The next control switch is a hydraulic start switch 488 which is used to actuate the motor starter for the main hydraulic pump providing hydraulic pressure for the whole conveyor system. This can be a push button, normally open switch. Next to this is a hydraulic stop switch 490 which deactivates the motor starter and which can be a push button, normally closed switch.

The remaining controls connected to line 472 are located on operator control pendant 256 indicated by the dashed line. This pendant is preferably attached by an electrical umbilical cord to the enclosure 400. As part of the control pendant there is selector switch 492 which is used to select the location for the control of the mobile conveyor, this location being either from the rear end car or the front end car. Also, on the control pendant is a joystick indicated at 494 which has a spring return to center position. By means of the joystick one can cause the mobile conveyor to tram forward or tram reverse and one can cause the wheels of the tail axle to steer right or steer left. These various operator switches are connected up to DC input module 496 which can be an Allen Bradley 1771-IBN 32 point module, in which case only the first half of the module need be used for present purposes. This module is electrically connected as shown to a 32 point DC output module 498 which can be an Allen Bradley 1771-OBN module. Electrically connected to this output module is one half of a Potter and Brumfield 2IO-16B optoisolator board indicated by the dashed line at 500. Also connected to the output module is a relay 502 that is used in the reversing of the tram direction and a tail car manual control indicator light 504 which blinks red when the car is operating manually. This is a pilot light located on the rear end car as are the other illustrated pilot lights shown in FIG. 28. The light 506 lights up red to indicate that the emergency stop is on. Light 508 is red to indicate if any intermediate vehicles are in manual mode while light 510 indicates that the hydraulics overload has tripped. The red light at 512 comes on when any of the tram overloads have tripped, whether they be thermal or magnetic, thus indicating a problem with a tram motor starter. The green light at 514 comes on when the hydraulics are operating.

Connected to the optoisolator board 500 is the motor starter for the tail axle. Also connected to this board are the two solenoids which operate the hydraulic steering valve 406 for the wheels of the tail axle. These solenoids are mounted on the valve manifold. The purpose of the board 500 is to allow output modules 24 VDC control signals to switch 120 VAC to the coils of the above components. The steering angle of the axle is controlled by a simple hydraulic power means controlled by the four way, three position hydraulic valve 406. This valve has the two electromagnetic solenoids to control the flow of hydraulic fluid to the steering cylinder. When no power is applied to either solenoid the wheels are locked in whatever position they are in. When power is applied to one solenoid, the wheels will be steered in one direction and when power is applied to the other solenoid, the wheels will steer in the other direction. At no time is power ever applied to both solenoids.

FIG. 29 illustrates the remaining electrical control components in the main control enclosure. The 120 volt line 465 is connected to a regulated power supply 516 which provides 5 volt direct current, 1.2 amps power. This power supply is connected by line 518 to the aforementioned optical incremental encoder 410 which in turn is connected to an encoder/counter module 520 operating in encoder mode. In the preferred embodiment this is a module available from Allen Bradley, Model 1771-IJ. The module is mounted in the PLC rack and feeds the distance travelled signal to the PLC. This module 520 maintains a pulse count in its memory that the PLC processor can access. The count value is incremented as the train of vehicles move in the rearward (toward loading car) direction and based on the quadrature information from the encoder decrements the count value as the train of vehicles move in the reverse (toward unloading car) direction. The processor can also send a signal to the encoder module that will cause it to reset its count value to zero. If the count value reaches 4095 counts when counting up, the counter will wrap around to 0 and continue counting up from 0 to 4095 again, likewise if the count value reaches 0 when counting down the count value will wrap around and begin counting down from 4095. Electrically connected between the incremental encoder and the module 520 is one-third of a 7404 hex inverter indicated at 522. This is a digital chip to invert the digital signal and is only used if inversion is required.

Also shown in FIG. 29 is analog input module 524 which can be that made by Allen Bradley, Model 1771-IFE, suitable for 4–20 ma differential inputs. Connected to this module is electrical control cable 526 which can be a Belden 9332 cable containing nine pairs of wires. These wires are connected up to the various intermediate control enclosures 402 and they provide the electrical signals from the various LDT's, to the module 524. The signals from the transducer for the rear end car axle are fed through wires 527 and 528. The axle position sensors or LDT's are connected to the analog input module using one channel per axle. This module converts the incoming 4–20 ma signal from each axle LDT to a decimal value that the processor can access. The LDT's are calibrated so that the output value will be 0 when the axles are steered all the way in one direction and 3100 when the axles are steered all the way in the other direction. This value indicates to the processor at what angle the wheels are steered with a value of 1550 indicating the wheels are straight.

FIG. 30 illustrates the electrical components in the typical intermediate vehicle control enclosure 402. Line 455 is connected up to a regulated power supply 530 providing 24 volt DC current at 1.2 amp. The output line 531 of this power supply is connected to several switches including an emergency stop switch 532, a manual steering switch 534, a manual tramming switch 536 and a control switch 538. These switches are similar to those found in the main control enclosure. There is also connected to the line an overload auxiliary contact 540 shown as reset and a circuit breaker auxiliary contact 542, also shown reset. These components and switches are connected to an Allan Bradley 1791-IOBB block input/output module 544. This module is connected to an optoisolator board 546 outlined in dashed marks. A suitable board is that made by Potter and Brumfield, Model No. 2IO-4B. One output line from this board is connected to the hydraulic tram motor 331 for the respective intermediate car. Further output lines are connected to two solenoids indicated at 548 and 550 which are used to control the hydraulic valve that acts to steer the wheels of the car. There is also a third solenoid 552 for operating the double headed cylinders.

Also connected to module 544 on the output side is a relay 554 for tramming in the reverse direction. There is also a manual control indicator at 555 in the form of a pilot light which blinks red when the car is operating manually. Connected to one end of the 24 volt line is the linear displacement transducer 218 for the intermediate car. This transducer is also connected to two wires 556 and 557 which connect up to the control cable 422.

FIG. 31 is a schematic illustration of many of the components in the main disconnect enclosure 404. Electrical line 449 is connected to a 24 volt direct current, 1.2 amp regulated power supply 560. Its 24 volt line 562, as in the other enclosures, is connected to a number of control switches including an emergency stop switch 564, a manual steering switch 566, a manual tramming switch 568 and a switch 570 for selecting between manual and auto control. There is also a hydraulics start switch 572 and a hydraulic stop switch 574. Also, connected to this line is an overload auxiliary contact 576 shown in the reset position and a circuit breaker auxiliary contact 578 shown reset. These switches are connected up to an Allen Bradley 1791-IOBB block I/O module 580. A number of output lines from this module are connected to an optoisolator board 582 which can be one-half of a Potter and Brumfield 2IO-16B board. Connected to the optoisolator board is a tram drive motor 331 for the head axle, that is the axle at the front of front end car 304. There are also connected to this board two solenoids which operate the hydraulic valve for steering the wheels mounted on the head axle. An electrical line 584 connects board 582 to the electric motor 414 which drives the hydraulic pump for the conveyor. Also connected to module 580 is the aforementioned two wire cable 420 which is the PLC communication cable and which extends to the next car. The same connectors on the board 580 as are connected to cable 420 are connected to a second Allan Bradley 1791-IOBB block I/O module 586 by line 588. This module is also connected to the 24 volt line 562. To this module is connected an overload (shown reset) 590 and the electrical connections for operator control pendant 592. The overload is shown in the non-tripped position and, if tripped, it would be open. As with the other control pendant, the pendant 192 provides by means of a joystick a control for tramming forward or in reverse and for steering the wheels on the head axle either right or left. Connected to the output of module 586 is a relay 592 that allows tramming of the head axle in reverse, a manual control indicator 594 and a control active indicator (green light) 596 that is located on the operator control pendant. These indicators are connected to electrical line 598 which also connects up to the linear transducer 408 for the head axle. Also connected to this transducer are two control wires 599 and 600 which connect up to the cable 422 which connects to the first in line intermediate vehicle control enclosure 402.

Located also in the main control enclosure is the processor or PLC which can be an Allen Bradley PLC 5/30. This processor is connected to the first intermediate control enclosure 402, that is the one on the rearmost intermediate car. It is connected to the intermediate closure by means of the cable 420 (see FIG. 25).

In the analog input module 524 all channels are set for differential current input.

The software program that operates the preferred embodiment of the mobile conveyor illustrated in FIGS. 18 to 31 is based on the Allen Bradley 6200 series PLC 5 software and it is designed to operate the aforementioned Allen Bradley PLC 5/30. The program set out hereinafter is for a four axle configuration (for instance, the four axles shown in FIG. 25) and is based on a total train or conveyor length of 60 feet so that the distance between axles is 20 feet or 240 inches. The program is further based on a tire diameter of 26 inches which corresponds to a tire circumference of 81.6814 inches and an axle gear ratio (wheel rev: pinion shaft rev.) of 1:3.07. Thus one revolution of the pinion shaft results in 26.6063 inches of travel of the train of vehicles. In this example, a steering correction is made every ten inches of linear travel of the train and this will translate to 200 encoder pulses. This implies that the encoder must be coupled to the pinion shaft at a ratio (pinion shaft rev: encoder shaft rev:) equal to $$\frac{10/26.6063}{200/500} = 0.9396$$

This is accomplished in a manner known per se by using two pulleys of different diameter so that one revolution of the encoder will indicate 25 inches of travel and, for example, 2/5ths of a revolution will indicate 10 inches of travel.

In the software program, a data table is set up to store axle position values in decimal form (0-3100). This table is retentive (when power is shut off, values remain). The data table length is determined by the total length of the train, the number of axles, and the desired distance between steering corrections.

In this example, the data table starts at integer file position N13:11 and uses 70 positions (words) in the table through to N13:81. Each axle is initially assigned a pointer value which is also stored in retentive memory. These pointers are, in the example, 23 memory locations apart from each other, since the axles are 240 inches apart and correction is made every ten inches. The pointer is used in indexed addressing to point to a location in the data table that the axle should either store its current value or move to the position indicated in the table. The pointer value for each axle is incremented every time the encoder/counter module accumulated count increases by 200 counts (10 inches of travel forward) and decremented every time the encoder/counter module accumulated count is decremented by 200 counts (10 inches of travel reverse).

In one embodiment, the pointer for the loading car axle is stored in memory location N13:1, the second axle in N13:6, the third axle in N13:7 and the leading axle of unloading car in N13:8. The initial values stored are 70, 47, 24, 1 respectively. The pointer values wrap, i.e., if a particular pointer value increases to 71, it is reset back to 1. If a particular pointer value decreases to 0 it is rest to 70. On first start up, a number of 1550 should be stored in all memory locations so the trailing axles will follow a straight path until fresh information of the leading axle is moved into memory.

A control loop for each axle is set up using the processors PID command. The axles position sensor forms a value that is fed back into the PID equation as its process value or PV. The PID equation executes continuously if it is enabled and outputs a control value or CV based on the set point SP and the process value. For the hydraulic valve selected, the control value is converted to a time proportioned output to drive either the steer left or steer right solenoid valves based on whether the process value (axle position) is above or below the commanded value or set point. This control loop is tuned manually until smooth response of the steering system occurs in response to a change in the setpoint and desired accuracy is obtained.

Further accuracy could be obtained by using a servo type hydraulic valve to control the steering, however, this adds cost to the system. The PID control loop of all of the intermediate axles is always enabled and the hydraulic system will keep the axle in the position commanded by the setpoint, unless the axle control is switched to manual at an intermediate control box at which time the manual steer left/right switch signals are directed to the solenoid valves.

Automatic control of the train of vehicles is initiated via the operator control pendant which is at the end of the train closest to the desired direction of travel. When the unit is stationary and the hydraulic pump has been started and no faults such as overload or emergency stops have been detected, the unit is ready for operation in either direction. The switch on the loading car operator control pendant is set to the desired control location activating either the loading car pendant or unloading car pendant. Prior to and during tramming of the train the operator can steer the end axle closest to him to any desired position. If the operator moves the joystick to the tram forward position the program determines whether the axle pivot solenoid valve is de-energized (correct position for forward travel) if it is not a value of 1550 (axle straight) is sent to the setpoint of the PID equation for the particular axle causing the wheels to straighten.

When the wheels are acceptably straight the solenoid for axle pivot is de-energized causing the axle to pivot to the correct position for forward travel. At the same time that tram forward is selected, an internal timer is activated (5 seconds in one embodiment) to delay startup of the tram motors to allow time for an alarm to sound prior to tramming and to allow time, for the axles to pivot to the correct position prior to movement of the train.

The same operation occurs if tram reverse is selected except that the solenoid is energized if it was de-energized to pivot the axle to the correct position for reverse steering.

When this pivoting of axles occurs, it must be realized that the end car in the direction of travel is now effectively a four wheeled rigidly connected car with both axles parallel to each other. Since the operator needs to be able to effectively steer this end car, the wheels on one axle must counter steer the wheels on the other axle about a centerline perpendicular to both axles. At the commencement of tramming (after the 5 second delay), the value read from the end car axle position transducer is subtracted from 3100 and the resulting value is placed as the setpoint to the PID equation for the second axle in toward the middle of the train. This process is continuous during tramming for the leading four wheeled car with the operator controlling the leading axle manually with the joystick and the trailing axle of the four wheeled car following a counter steered path. At the same time data from the leading axle and trailing axle of the four wheeled car is being stored into memory locations in the data table pointed to by their respective axle pointers. At the same time the other trailing axles of the train are reading the values in the data table locations pointed to by their respective pointers and moving this value to the setpoint of their PID equations. From this it can be seen that all of the trailing axles follow a path that the trailing axle of the four wheeled lead vehicle has followed. In the reverse direction the process reverses itself.

Another feature is that if any of the axles trailing the lead axle are switched into manual during tramming, the value of the position transducer of the particular axle overwrites data in the data table at the location pointed to by its pointer. This allows all of the following vehicles to make the same correction that was made manually at a certain position along the train. This is useful if material has fallen down off of a mine wall after the lead vehicle has passed the location where the fall has occurred.

Various modifications and changes to the steering system as described will be apparent to those skilled in this art. All such modifications and changes as fall within the scope of the appended claims are intended to be part of this invention.

I claim:

1. A steering system capable of steering a plurality of vehicles in a train comprising:
   a selected pair of transversely aligned propelling devices, each separately connected at a generally vertical pivot to an axle of a selected vehicle in said train;
   means for steering said selected pair of propelling devices as the train moves over the ground;
   at least two further pairs of steerable, transversely aligned propelling devices, each of said further pairs being connected to its own respective vehicle and supporting same, each propelling device in each of said further pairs being separately connected at a generally vertical pivot to an axle of the respective vehicle;
   power means for steering each of said further pairs of propelling devices; and
   control means for controlling said power means in order to set the steering angle of each of said further pairs of propelling devices, said control means including means for determining the current steering angle of said selected pair of propelling devices and generating an electrical signal indicative thereof, means for storing a series of said electrical signals as the train is travelling on the ground, means for determining the distance the propelling devices in the train have been travelling, and means for sending electrical turn signals to said power means for said further pairs of propelling devices in order to operate said power means, wherein said control means sets the steering angle of each further pair at substantially the same steering angle that said selected pair of propelling devices had when they were at the location where the particular further pair is currently located.

2. The steering system according to claim 1 wherein said control means includes further means for determining the current steering angle of each of said further pairs of propelling devices and generating further electrical signals indicative of the current steering angles of said further pairs.

3. A steering system according to claim 1 wherein said means for sending electrical turn signals is a programmable logic controller.

4. A steering system according to claim 1 wherein said power steering means comprises two hydraulic cylinder mechanisms for each of said further pairs, each mechanism having a movable rod pivotally connected to a steering arm connected to one propelling device of the respective pair of propelling devices.

5. A steering system according to claim 1 wherein the means for determining the current steering angle of the selected pair of propelling devices is a linear displacement transducer.

6. A steering system according to claim 2 wherein said means for determining the current steering angle of both the selected and the further pairs of steerable propelling devices comprise linear displacement transducers and there is at least one of said transducers for each pair of propelling devices.

7. A steering system according to claim 1 wherein said selected pair of propelling devices and said further pairs of propelling devices are all motor-driven wheels.

8. A steering system according to claim 1 wherein said selected vehicle is a loading car or an unloading car of a mobile conveyor system formed by said plurality of vehicles and all of said propelling devices comprise wheels.

9. A steering system according to claim 1 wherein said distance determining means includes a radar sensor capable of measuring the speed of travel of said train and generating another electrical signal indicative of the train speed at a certain time during train travel.

10. A steering system according to claim 3 wherein each vehicle in said train, except the vehicle at the front thereof, has one axle and one pair of propelling devices in the form of wheels pivotally mounted thereon and said front vehicle has two axles with a pair of propelling devices in the form of wheels mounted on each of said two axles.

11. A steering system according to claim 1 wherein, all axles in said train except a first axle and a last axle at the end of said train furthest from said first axle are each pivotally connected to adjoining vehicles by front and rear pivot devices each providing a vertical pivot axis, said front pivot device being located forwardly of its respective axle and said rear pivot device being located rearwardly of its respective axle, and means for locking each of said axles, except said first and last axles, in a position at right angles to the longitudinal centerline of either the vehicle immediately in front of the respective axle or the vehicle immediately to the rear thereof.

12. A steering system according to claim 11 wherein said locking means for each axle comprises first and second hydraulic cylinder mechanisms, the first capable of preventing pivotal movement about said front pivot device and the second capable of preventing pivotal movement about said rear pivot device.

13. A steering system according to claim 12 wherein each hydraulic cylinder mechanism is double headed and is pivotally connected at one end to its respective axle and at its opposite end to a frame of an adjoining vehicle, said cylinder mechanism moving to its mid stroke position upon being pressurized.

14. A steering system according to claim 12 wherein one of said pivot devices for each axle is a pintle hitch which enables two adjoining vehicles to be detached from one another.

15. A steering system according to claim 12 wherein said control means includes further means for determining the current steering angle of each of said further pairs of propelling devices and generating further electrical signals indicative of the current steering angles of said further pairs.

16. A steering system according to claim 15 wherein said means for generating said electrical turn signals is a programmable logic controller, which controller also controls said hydraulic cylinder mechanisms for the axles.

17. A cascading mobile conveyor comprising:
   a plurality of vehicles pivotally connected together in the form of a train with each vehicle having part of a conveying system arranged thereon, said vehicles including a loading vehicle located at a rear end of the train, at least one intermediate vehicle, and an unloading vehicle located at a front end of said train;

a selected pair of transversely aligned propelling devices each separately connected at a generally vertical pivot to one of said vehicles;

means for steering said selected pair of propelling devices;

further pairs of steerable, transversely aligned propelling devices pivotally mounted on vehicles that are trailing said one vehicle relative to a selected direction of train movement, said further pairs supporting their respective vehicles;

power means for steering each of said further pairs of propelling devices;

electrical control means for controlling said power means in order to set the steering angle of each of said further pairs of propelling devices, said control means including means for determining the current steering angle of said selected pair of propelling devices and generating a first electrical signal indicative thereof, means for storing a series of said first electrical signals as the train is travelling, means for determining the distance the propelling devices in the train have travelled, and means for sending electrical turn signals to said power means for said further pairs of propelling devices in order to operate said power means, wherein said control means sets the steering angle of each further pair at substantially same steering angle that said selected pair of propelling devices had when they were at the same location where the particular further pair is currently located.

18. A mobile conveyor according to claim 17 wherein said control means includes further means for determining the current steering angle of each of said further pairs of propelling devices and generating further electrical signals indicative of the current steering angles of said further pairs.

19. A mobile conveyor according to claim 17 wherein said means for sending electrical turn signals is a programmable logic controller.

20. A mobile conveyor according to claim 17 wherein all of said propelling devices are wheels and said power steering means comprises at least one hydraulic cylinder mechanism for each of said further pairs of steerable wheels, each hydraulic cylinder mechanism including an elongate cylinder and a piston rod slidable in said cylinder and connected to a steering arm joined to one wheel of the respective pair of wheels.

21. A mobile conveyor according to claim 17 wherein said means for determining the current steering angle of said selected pair of propelling devices is a linear displacement transducer.

22. A mobile conveyor according to claim 18 wherein said means for determining the current steering angle of both the selected and further pairs of steerable propelling devices comprise linear displacement transducers and there is at least one of said transducers for each pair of propelling devices.

23. A mobile conveyor according to claim 17 wherein said distance determining means includes a radar sensor capable of measuring the speed of travel of said train and generating another electrical signal indicative of the train speed at a certain time during train travel.

24. A mobile conveyor according to claim 17 wherein all of said propelling devices are wheels, each of said loading vehicle and the or each intermediate vehicle has only one wheel axle with a respective pair of steerable wheels mounted thereon, and said unloading vehicle has two axles with a pair of steerable wheels mounted on each of said two axles.

25. A cascading mobile conveyor according to claim 19 wherein said distance determining means includes means for determining the amount of time the propelling devices have been travelling from a set point in time, and said time determining means is a retentive timer whose starting time corresponds to said set point in time, said starting time being reset after a selected time interval has elapsed.

26. A cascading mobile conveyor according to claim 17 wherein said signal storing means stores said first electrical signals in an ordered series of storage positions each corresponding to one of the pairs of transversely aligned propelling devices in said train and said electrical control means moves each of the stored first electrical signals, except the last one, to the next storage position in the series after said selected time interval has elapsed.

27. A cascading mobile conveyor according to claim 26 wherein, when each selected electrical signal is moved to the next storage position, said angle determining means operates at the same time to determine the current steering angle of said first pair of propelling devices and sends another first electrical signal to a first storage position in said series of storage positions.

28. A cascading mobile conveyor according to claim 26 wherein said control means includes further means for determining the current steering angle of each of said further pairs of propelling devices and generating further electrical signals indicative of the current steering angles of said further pairs.

29. A mobile conveyor according to claim 17 including means for selecting between two pairs of propelling devices to be steered by an operator of said mobile conveyor in order that the conveyor can be steered from either the rear end of the train or the front end of the train.

30. A mobile conveyor according to claim 17 wherein said electrical control means includes means for selecting between forward and reverse directions of movement of said conveyor and wherein the location of said selected pair of propelling devices steered by said steering means is determined by said direction selecting means.

31. A mobile conveyor according to claim 17 wherein said electrical control means includes means for manually steering at least some of said further pairs of propelling devices independently of the other pairs of propelling devices and of any stored electrical signal indicative of the steering angle of the selected pair of propelling devices.

32. A mobile conveyor according to claim 17 wherein each of said pairs of propelling devices is mounted on its own axle, a number of said axles are each pivotally connected to their respective vehicle and an adjacent vehicle by front and rear pivot devices each providing a vertical pivot axis, said front pivot devices are located forwardly of their respective axles, said rear pivot devices are located close to and rearwardly of their respective axles, and there are provided means for locking each of said number of axles in a position perpendicular to the centerline of either their respective vehicle or said adjacent vehicle depending on the direction of travel of the conveyor.

33. A mobile conveyor according to claim 32 wherein said locking means for each of said number of axles comprises first and second hydraulic cylinder mechanisms, the first capable of preventing pivotal movement of its respective front pivot device and the second capable of preventing pivotal movement about its respective rear pivot device.

34. A mobile conveyor according to claim 33 wherein each hydraulic cylinder mechanism is double headed and is pivotally connected at one end to its respective axle and at its opposite end to a frame of an adjacent vehicle, each cylinder mechanism moving to a mid stroke position upon being pressurized.

35. A mobile conveyor according to claim 32 wherein the rear pivot devices comprise pintle hitches each of which enables adjoining vehicles to be readily detached from one another.

36. A mobile conveyor according to claim 33 wherein said control means includes further means for determining the current steering angle of each of said further pairs of propelling devices and generating further electrical signals indicative of the current steering angles of said further pairs.

37. A mobile conveyor according to claim 36 wherein said means for sending electrical turn signals to said power means is a programmable logic controller which also controls said hydraulic cylinder mechanisms for the axles.

* * * * *

UNITED STATES PATENT AND TRADEMARK OFFICE
CERTIFICATE OF CORRECTION

PATENT NO. : 5,366,059
DATED : November 22, 1994
INVENTOR(S) : Maurice Demong

It is certified that error appears in the above-indentified patent and that said Letters Patent is hereby corrected as shown below:

Column 3, line 29, after "side" delete --.--.

Column 10, line 24, after "therein" insert --.--.

Column 10, line 24, delete "in" and insert therefore --In--.

Column 12, line 61, "neap" should be --near--.

Column 13, line 7, "Car" should be --car--.

UNITED STATES PATENT AND TRADEMARK OFFICE
CERTIFICATE OF CORRECTION

PATENT NO. : 5,366,059
DATED : November 22, 1994
INVENTOR(S) : Maurice Demong

It is certified that error appears in the above-indentified patent and that said Letters Patent is hereby corrected as shown below:

Column 26, line 21, claim 27, "selected" should be --first--.

Column 26, line 5, claim 27, "first" should be --selected--.

Column 26, line 60, claim 32, after "located" delete --close to and--.

Signed and Sealed this

Twenty-fifth Day of April, 1995

Attest:

BRUCE LEHMAN

*Attesting Officer*   *Commissioner of Patents and Trademarks*